(12) United States Patent
Silveira et al.

(10) Patent No.: US 8,457,501 B2
(45) Date of Patent: Jun. 4, 2013

(54) REDUCTION OF POLARIZATION-DEPENDENT LOSS IN DOUBLE-PASS GRATING CONFIGURATIONS

(75) Inventors: Paulo E. X. Silveira, Boulder, CO (US); Tony Sarto, Platteville, CO (US); Larry Fabiny, Boulder, CO (US); Marko Voitel, Boulder, CO (US)

(73) Assignee: Altera Corporation, San Jose, CA (US)

( * ) Notice: Subject to any disclaimer, the term of this patent is extended or adjusted under 35 U.S.C. 154(b) by 1390 days.

(21) Appl. No.: 10/171,434

(22) Filed: Jun. 12, 2002

(65) Prior Publication Data

US 2002/0196496 A1 Dec. 26, 2002

Related U.S. Application Data

(63) Continuation-in-part of application No. 10/076,182, filed on Feb. 12, 2002, which is a continuation-in-part of application No. 09/706,489, filed on Nov. 3, 2000, now Pat. No. 6,751,415.

(51) Int. Cl.
*H04B 10/00* (2006.01)
*G02B 5/32* (2006.01)

(52) U.S. Cl.
USPC ............................................ 398/152; 385/18

(58) Field of Classification Search
USPC ................................. 398/82, 86–88
See application file for complete search history.

(56) References Cited

U.S. PATENT DOCUMENTS

| | | | |
|---|---|---|---|
| 5,414,540 A | 5/1995 | Patel et al. | |
| 5,659,413 A | 8/1997 | Carlson | |
| 5,724,165 A | 3/1998 | Wu | |
| 5,862,287 A | 1/1999 | Stock et al. | |
| 5,912,748 A | 6/1999 | Wu et al. | |
| 5,917,625 A * | 6/1999 | Ogusu et al. | 385/24 |
| 5,960,133 A | 9/1999 | Tomlinson | |
| 5,986,815 A * | 11/1999 | Bryars | 359/634 |
| 5,999,672 A | 12/1999 | Hunter et al. | |
| 6,097,519 A | 8/2000 | Ford et al. | |
| 6,097,859 A | 8/2000 | Solgaard et al. | |
| 6,108,471 A | 8/2000 | Zhang et al. | |
| 6,249,364 B1 | 6/2001 | Martin et al. | |
| 6,275,623 B1 | 8/2001 | Brophy et al. | |
| 6,307,657 B1 | 10/2001 | Ford | |
| 6,360,037 B1 * | 3/2002 | Riza | 385/22 |
| 6,362,919 B1 | 3/2002 | Flanders | |
| 6,381,387 B1 | 4/2002 | Wendland, Jr. | |
| 6,396,575 B1 * | 5/2002 | Holland | 356/73.1 |

(Continued)

OTHER PUBLICATIONS

U.S. Appl. No. 9/442,061, filed Nov. 16, 1999, Weverka et al.

(Continued)

*Primary Examiner* — Kenneth N Vanderpuye
*Assistant Examiner* — Abbas H Alagheband
(74) *Attorney, Agent, or Firm* — Ropes & Gray LLP

(57) ABSTRACT

Optical systems for routing light that reduce or eliminate polarization-dependent loss are provided. Such optical systems generally accommodate an optical element that has an intrinsic polarization-dependent loss and which is disposed to be encountered twice by the light being routed. In some instances, the optical element may be a dispersive element such as a diffraction grating or prism, but the invention has more general applicability. The optical system additionally includes both a reflective element and a wave plate assembly disposed to be encountered by the light between encounters with the dispersive element.

2 Claims, 14 Drawing Sheets

U.S. PATENT DOCUMENTS

| | | | | | |
|---|---|---|---|---|---|
| 6,529,307 | B1* | 3/2003 | Peng et al. | ..................... | 359/256 |
| 6,563,977 | B1* | 5/2003 | Chen et al. | ....................... | 385/24 |
| 6,634,810 | B1* | 10/2003 | Ford et al. | ....................... | 398/88 |
| 6,687,423 | B1* | 2/2004 | Yao | ................................ | 385/11 |
| 6,751,415 | B1 | 6/2004 | Fabiny | | |
| 6,826,330 | B1* | 11/2004 | Godil et al. | ..................... | 385/37 |
| 2002/0181856 | A1* | 12/2002 | Sappey et al. | ................... | 385/24 |

OTHER PUBLICATIONS

Sun, Z.J., et al., "Demultiplexer with 120 Chanels and 0.29-nm Channel Spacing." IEEE Photonics Technology Letters, vol. 10, No. 1. Jan. 1998, pp. 90-92.

Nishi. I., et al., "Broad-Passband-Width Optical Filter for Multi/Demultiplexer Using a Diffraction Grating and a Retroreflector Prism," Electronics Letters, vol. 21, No. 10, May 1985, pp. 423-424.

Phillippe P., et al., "Wavelength demultiplexer: using echelette gratings on silicon substrate," Applied Optics, vol. 24, No. 7, Apr. 1985, pp. 1008-1011.

Piezo Systems, Inc. Catalog #3, 1998, pp. 1, 30-45.

Ford, Joseph E., et al., "Wavelength Add-Drop Switching Using Tilting Micromirrors," Journal of Lightwave Technology, vol. 17, No. 5, May 1999, pp. 904-011.

Grade, John D., et al., "A Large-Deflection Electrostatic Actuator for Optical Switching Applications," Solid State Sensor and Actuator Workshop, Hilton Head Island, SC, Jun. 4-8, 2000.

Rallison, R.D., "Dense Wavelength Division Multiplexing (DWDM) and the Dickson Grating," White Paper, Jan. 6, 2001.

* cited by examiner

REDUCTION OF POLARIZATION-DEPENDENT LOSS IN DOUBLE-PASS GRATING CONFIGURATIONS

CROSS-REFERENCES TO RELATED APPLICATIONS

This application is a continuation-in-part application of U.S. patent application Ser. No. 10/076,182, entitled "REDUCTION OF POLARIZATION-DEPENDENT LOSS FROM GRATING USED IN DOUBLE-PASS CONFIGURATION," filed Feb. 12, 2002 by Larry Fabiny, which is a continuation-in-part application of U.S. patent application Ser. No. 09/706,489, entitled "REDUCTION OF POLARIZATION-DEPENDENT LOSS FROM GRATING USED IN DOUBLE-PASS CONFIGURATION," filed Nov. 3, 2000 by Larry Fabiny, the entire disclosures of both of which are herein incorporated by reference for all purposes.

BACKGROUND OF THE INVENTION

This application relates generally to optical communications networks, and more specifically to a method and apparatus for reducing the polarization dependent loss ("PDL") from diffraction gratings used in such communications networks.

The Internet and data communications are causing an explosion in the global demand for bandwidth. Fiber optic telecommunications systems are currently deploying a relatively new technology called dense wavelength division multiplexing (DWDM) to expand the capacity of new and existing optical fiber systems to help satisfy this demand. In DWDM, multiple wavelengths of light simultaneously transport information through a single optical fiber. Each wavelength operates as an individual channel carrying a stream of data. The carrying capacity of a fiber is multiplied by the number of DWDM channels used. Today, DWDM systems using up to 80 channels are available from multiple manufacturers, with more promised in the future.

Optical wavelength routing functions often use demultiplexing of a light stream into its many individual wavelengths, which are then optically directed along different paths. Subsequently, different wavelength signals may then be multiplexed into a common pathway. Within such routing devices, the optical signals are routed between the common and individual optical pathways by a combination of dispersion and focusing mechanisms. The focusing mechanism forms discrete images of the common pathway in each wavelength of the different optical signals and the dispersion mechanism relatively displaces the images along a focal line by amounts that vary with the signal wavelength.

Both phased arrays and reflection diffraction gratings may be used to perform the dispersing functions. While phased arrays are adequate when the number of channels carrying different wavelength signals is small, reflection diffraction gratings are generally preferable when large numbers of channels are used. However, reflection diffraction gratings tend to exhibit greater polarization sensitivity and since the polarization of optical signals often fluctuates in optical communication systems, this sensitivity may result in large variations in transmission efficiency. Loss of information is possible unless compensating amplification of the signals is used to maintain adequate signal-to-noise ratios. Although polarization sensitivity may generally be mitigated by increasing the grating pitch of the reflection grating, limitations on the desired wavelength dispersion for signals at optical telecommunication wavelengths preclude an increase in grating pitch sufficient to achieve high diffraction efficiency in all polarization directions.

Suggestions to reduce polarization dependent losses in optical switching systems have included complex polarization splitting and recombination techniques, such as described in WO 98/35251, published Aug. 13, 1998. In the method described therein, an optical beam is separated into distinct subbeams for different polarization states and optically constrained to follow different paths, which ultimately converge so that the subbeams may be recombined. Creating and maintaining separate optical paths requires additional components and increases both the cost and complexity of the devices that use the method. Furthermore, the recombination of the subbeams requires very precise alignment of the optical components to prevent the introduction of spurious distortion resulting from imperfect recombination.

It is therefore desirable to provide a method and apparatus that reduces or eliminates polarization dependent loss from diffraction gratings used in optical telecommunications systems without requiring beams with different polarization states to follow different optical paths.

BRIEF SUMMARY OF THE INVENTION

Embodiments of the invention thus provide optical systems for routing light that reduce or eliminate polarization-dependent loss. Such optical systems generally accommodate an optical element that has an intrinsic polarization-dependent loss and which is disposed to be encountered twice by the light being routed. In some instances, the optical element may be a dispersive element such as a prism or diffraction grating, including either a reflection or transmissive grating, but embodiments of the invention have more general applicability. A particular example of an optical system that uses a dispersive element is a wavelength router in which the light comprises a plurality of spectral bands that may be routed individually according to configurations of other components in the optical system. Thus, according to embodiments of the invention, the optical system includes, in addition to the intrinsic-PDL optical element, both a reflective element and a wave plate assembly disposed to be encountered by the light between encounters with the intrinsic-PDL optical element.

In certain embodiments, the wave plate assembly comprises a wave plate that has at least one of a retardance and an orientation optimized according to a material property of the reflective element. Such a material property may comprise an index of refraction, particularly a complex index of refraction that accounts for absorption resulting from reflections off the reflective element. The optimization may be performed by determining first and second effects on polarization states of the light after propagation at least between encounters with the optical element, the first effect accounting for the material property of the reflective element and the second effect not accounting for the material property. The desired characteristic of the wave plate, such as a desired retardance or a desired orientation, is calculated by locally minimizing a difference between the first and second effects with respect to the characteristic.

For example, in a particular embodiment, the reflective element comprises an even number of reflective surfaces disposed to be encountered by the light. In such an embodiment, determining the second effect treats the wave plate as a half-wave plate, which has a retardance appropriate for reducing the polarization-dependent loss under such circumstances when the reflective surfaces are ideal. In another embodiment, the reflective element comprises an odd number of reflective surfaces disposed to be encountered by the light. In such an embodiment, determining the second effect treats the wave plate as a quarter-wave plate, which has a retardance appropriate for reducing the polarization-dependent loss under such circumstances when the surfaces ideal.

In other embodiments, the wave-plate assembly has at least two degrees of freedom. In one such embodiment, the degrees of freedom are provided by the orientations of a plurality of wave plates comprised by the assembly. Such a plurality of wave plates may have different retardances, such as provided by a pair of wave plates, one of which is a quarter-wave plate and one of which is a half-wave plate. In another such embodiment, the degrees of freedom are provided with a wave plate having variable retardance and orientation, such as provided by a liquid-crystal retarder.

In still further embodiments, the wave-plate assembly comprises a wave plate disposed to be encountered by the light once between encounters with the optical element. In All a specific such embodiment, the reflective element comprises an even number of reflective surfaces disposed to be encountered by the light and the wave plate comprises a half-wave plate with a fast axis oriented with respect to the dichroic axes of the optical element at substantially an odd multiple of 45°. In another specific such embodiment, the reflective element comprises an odd number of reflective surfaces disposed to be encountered by the light and the wave plate comprises a circular half-wave plate.

BRIEF DESCRIPTION OF THE DRAWINGS

A further understanding of the nature and advantages of the present invention may be realized by reference to the remaining portions of the specification and the drawings wherein like reference labels are used throughout the several drawings to refer to similar components. In some instances, a sublabel is associated with a reference numeral and is enclosed in parentheses to denote one of multiple similar components. When reference is made to a reference numeral without specification to an existing sublabel, it is intended to refer to all such multiple similar components.

DETAILED DESCRIPTION OF THE INVENTION

1. Introduction

The following description sets forth embodiments of a method and apparatus that reduces or eliminates polarization dependent losses from an optical element having an intrinsic PDL, such as a diffraction grating. In certain embodiments, the arrangements accommodate additional losses that would otherwise result from optical configurations that use the optical element, including both stray retardances and absorption by reflective surfaces. The description below focuses on applications that use a diffraction grating, but it should be understood that the principles used in embodiments of the invention may apply more generally to intrinsic-PDL optical elements used in double-pass configurations. Embodiments of the invention may be used generally in optical telecommunications systems or in other applications where reduction of polarization dependent losses is desirable. In particular embodiments, such polarization dependent losses are reduced or eliminated in a wavelength router to achieve the goals of optical networking systems.

The general functionality of some such optical wavelength routers that can be used with embodiments of the invention is described in detail in the copending, commonly assigned U.S. patent application, filed Nov. 16, 1999 and assigned Ser. No. 09/442,061, entitled "Wavelength Router" ("the '061 application"), which is herein incorporated by reference in its entirety, including the Appendix, for all purposes. As described therein, such optical wavelength routers accept light having a plurality of spectral bands at an input port and selectively direct subsets of the spectral bands to desired ones of a plurality of output ports. Light entering such a wavelength router from the input port forms a diverging beam, which includes the different spectral bands. The beam is collimated, such as by a lens or concave mirror, and directed to a diffraction grating that disperses the light so that collimated beams at different wavelengths are directed at different angles. The separated beams are directed to the output ports according to states of dynamically configurable routing elements, which in different embodiments may include different numbers of reflective surfaces.

As such, the wavelength router includes an intrinsic-PDL optical element, i.e. the diffraction grating, that is used in a double-pass configuration. The reduction in polarization dependent losses achieved by embodiments of the invention translates directly into improved efficiency in operation of the wavelength router. As discussed below, different embodiments are more suitable for optical configurations in which the dynamically configurable routing elements have different numbers of reflective surfaces disposed to be encountered by light beams.

2. Diffraction of Optical Signals

Figure 1:
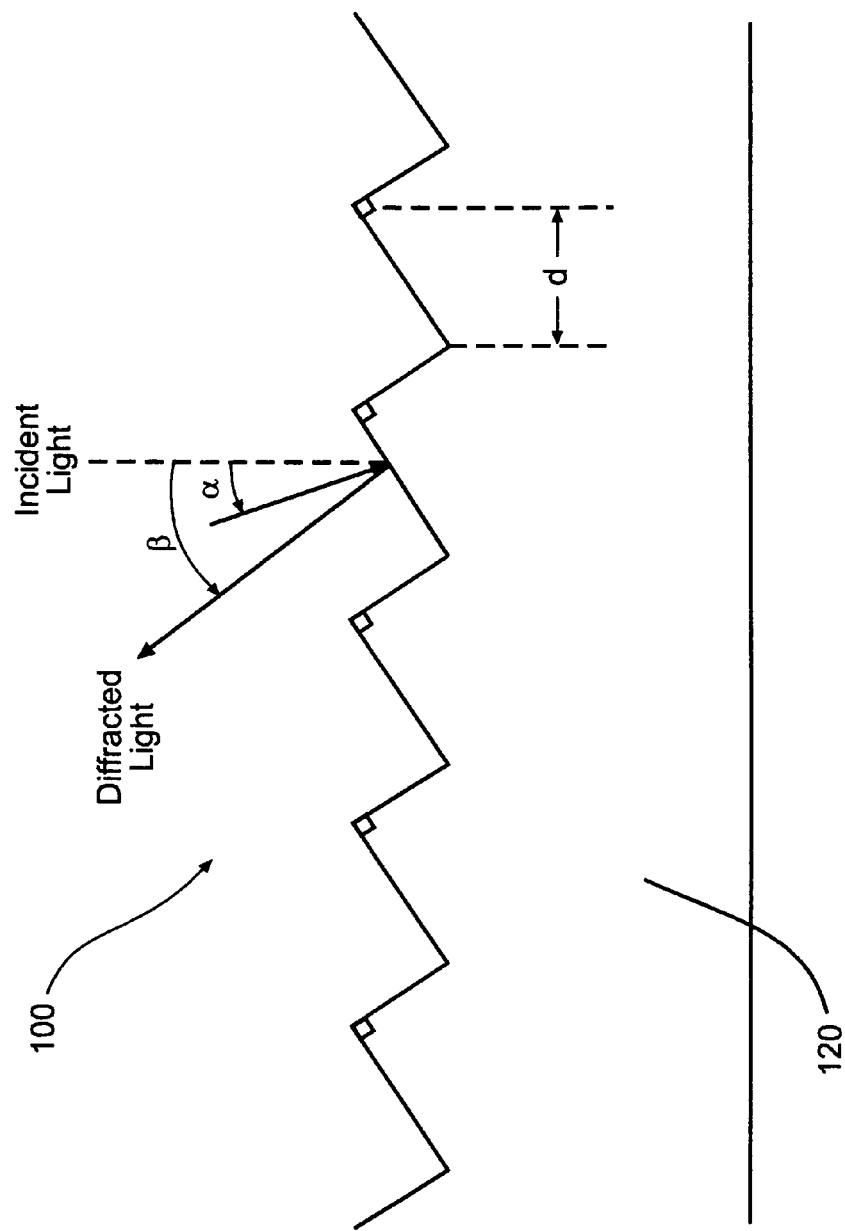
FIG. 1 is a schematic diagram illustrating a reflection diffraction grating.

Demultiplexing of an optical signal that contains a plurality of signals at different wavelengths may be accomplished with a diffraction grating with appropriately sized and shaped diffraction grooves. An example of such a demultiplexing diffraction grating is illustrated in FIG. 1. When illuminated at an angle α from the normal, the grating 100 directs light with wavelength λ toward angle β in accordance with the formula $$m\lambda = d(\sin\alpha \pm \sin\beta),$$

where m is an integral order of interference and d is the grating period. The manner in which incident light will be distributed among the various orders of interference depends on the shape and orientation of the groove sides and on the relation of wavelength to groove separation. When d<λ, diffraction effects predominate in controlling the intensity distribution among orders, but when d>λ, optical reflection from the sides of the grooves is more strongly involved. Diffraction gratings 100 are manufactured classically with the use of a ruling engine by burnishing grooves with a diamond stylus in a substrate 120 or holographically with the use of interference fringes generated at the intersection of two laser beams.

The efficiency of the diffraction grating depends on the polarization state of the incident light. The electric field E of an arbitrarily polarized incident optical signal may be written as a superposition of two electric fields linearly polarized along two orthogonal axes $\hat{x}$ and $\hat{y}$:

$$E = E_x\hat{x} + E_y\hat{y}.$$

The intensity $I_0$ of the incident signal is defined by the strength of the electric field along the orthogonal directions:

$$I_0 = |E_x|^2 + |E_y|^2,$$

where units have been chosen in which the permittivity of the medium is equal to four times the permeability of the medium to make the remaining derivation more transparent. The efficiency is governed by independent efficiency coefficients $\epsilon$ in the orthogonal polarization directions such that the electric field E' of the signal reflected by the grating is $$E' = -\varepsilon_x E_x \hat{x} - \varepsilon_y E_y \hat{y},$$

with total intensity $$I' = \epsilon_x^2 |E_x|^2 + \epsilon_y^2 |E_y|^2.$$

It is thus evident that the intensity of a signal linearly polarized along one of the two orthogonal axes is reflected by the diffraction grating with an intensity dependent only on the efficiency coefficient for that direction:

$$I'^x = \epsilon_x |E_x|^2$$

$$I'^y = \epsilon_y |E_y|^2.$$

For most diffraction gratings, $\epsilon_x \neq \epsilon_y$, SO there may be large variability in the overall efficiency and resulting polarization-dependent loss as a function of the polarization state of the incident signal.

3. Polarization Rotation

In embodiments of the invention, this variability is reduced or eliminated by imposing a polarization rotation. Such a polarization rotation may be achieved by introducing a wave delay along one polarization component of the electric field. In one embodiment, this may be achieved by using a wave plate, which is constructed asymmetrically so that different indices of refraction are achieved in two orthogonal directions. Thus, when the incident optical signal passes through the wave plate, one component of the electric field is delayed relative to the other. Wave plates are commonly constructed to impose phase differences of π ("half-wave plate") or π/2 ("quarter-wave plate"), but may more generally be constructed to impose any desired phase difference. As explained below, the choice and orientation of a suitable wave plate may depend on certain optical characteristics of a particular arrangement.

Figure 2A:
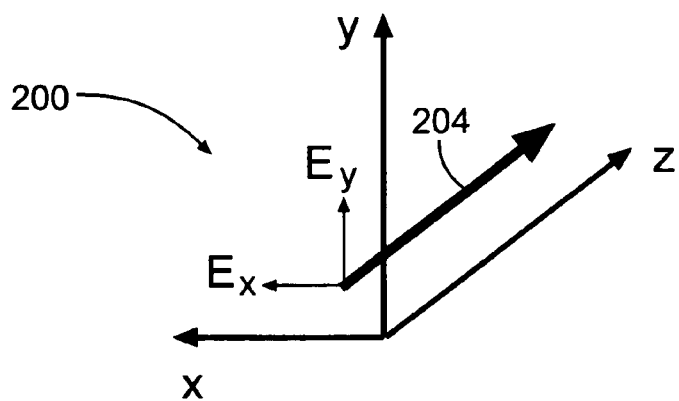
FIG. 2A is a schematic diagram defining a coordinate system used in describing embodiments of the invention.

FIG. 2A illustrates a right-handed (x, y, z) coordinate 200 convention used for illustration of embodiments of the invention in which light propagates along the +z axis. Electric-field components $E_x$ and $E_y$ are orthogonal to each other and to the propagation vector 204, shown in bold. Whenever the propagation vector is altered, such as by reflection from a reflective surface, a new coordinate system (x', y', z') is defined with light propagating along the +z' axis. While new x' and y' axes may be chosen arbitrarily within the constraints of a right-handed coordinate system, the following discussion conventionally defines y' as the reflected image of y, with x' being defined by maintaining a right-handed coordinate system.

Figure 2B:
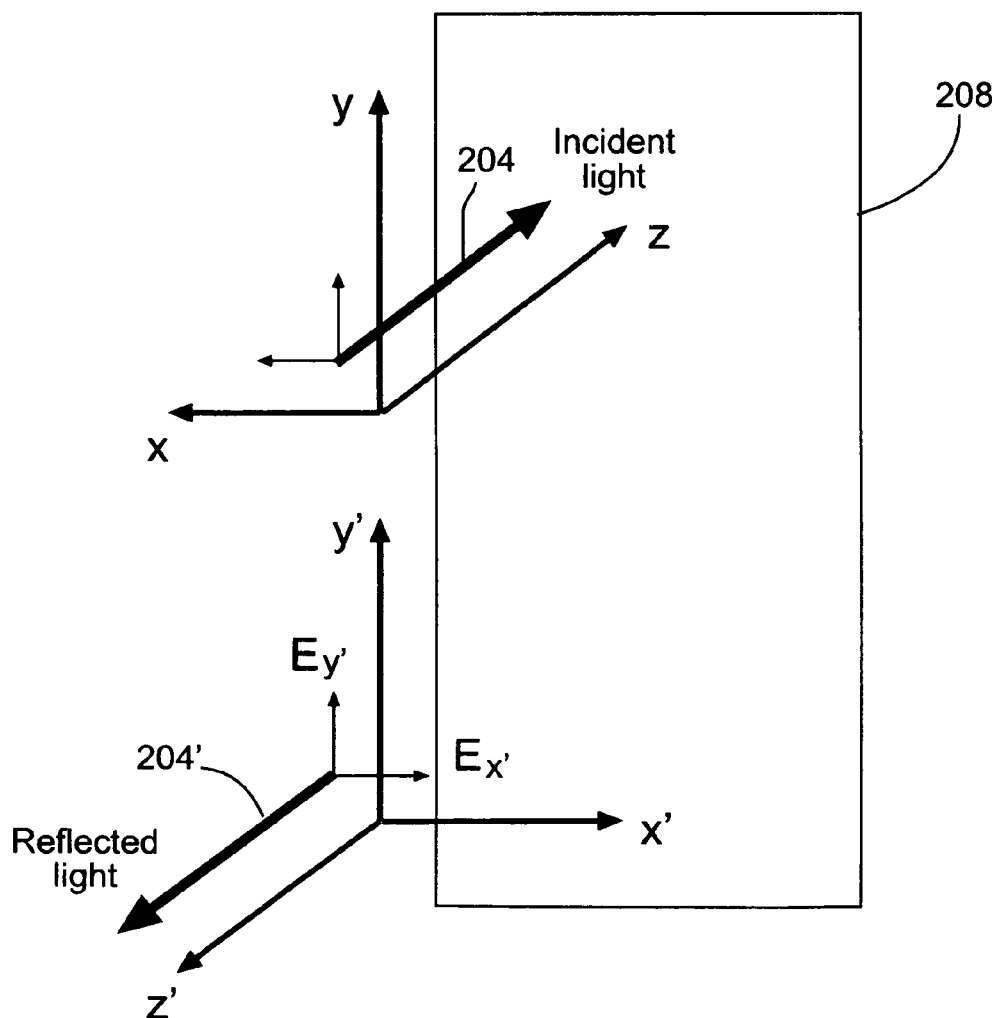
FIG. 2B is a schematic diagram illustrating the effect on the coordinate system of a retroreflection using an odd number of reflections.
Figure 2C:
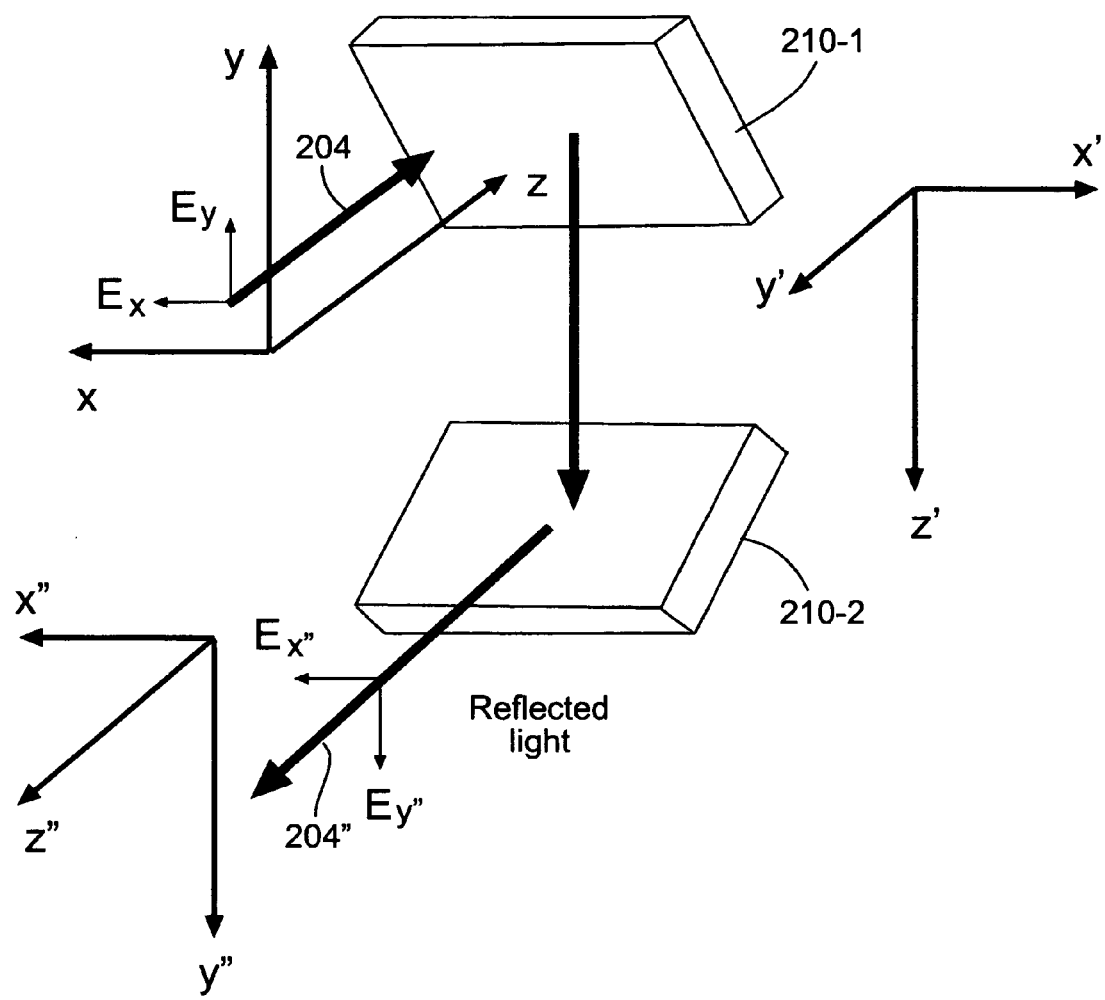
FIG. 2C is a schematic diagram illustrating the effect on the coordinate system of a retroreflection using an even number of reflections.

The effects of retroreflection on the coordinate system are shown in FIGS. 2B and 2C for a retroreflector consisting respectively of on odd number (one) and an even number (two) of reflective surfaces. Thus, in FIG. 2B, the retroreflector consists of a single reflective surface 208 in the xy plane, i.e. orthogonal to the propagation vector. The z axis is reflected so that z' is antiparallel to z and the y axis is unchanged by the reflective surface. As a result, x' is antiparallel to x. In FIG. 2C, the retroreflector consists of two reflective surfaces 210 each inclined at 45° relative to the propagation vector. Using the convention described above, the coordinate system (x", y", z") resulting from the two reflections has x" parallel to the original x axis, y" antiparallel to the original y axis, and z" antiparallel to the original z axis.

To account for light polarization states during propagation through an optical assembly, the Jones matrix notation is used for the x and y components, writing the electric field vector as a 1×2 matrix element:

$$E = E_x\hat{x} + E_y\hat{y} = \begin{bmatrix} E_x \\ E_y \end{bmatrix}.$$

In this notation, certain specific polarization states are written as follows:

(i) linear horizontal polarization:

$$E_0^{LH} = E_0\hat{x} = E_0\begin{bmatrix} 1 \\ 0 \end{bmatrix};$$

(ii) linear vertical polarization:

$$E_0^{LV} = E_0\hat{y} = E_0\begin{bmatrix} 0 \\ 1 \end{bmatrix};$$

(iii) right-hand circular polarization("RHP"):

$$E_0^{RHP} = E_0 \frac{\hat{x} + i\hat{y}}{\sqrt{2}} = \frac{E_0}{\sqrt{2}} \begin{bmatrix} 1 \\ i \end{bmatrix}; \text{ and}$$

(iv) left-hand circular polarization ("LHP"):

$$E_0^{LHP} = E_0 \frac{\hat{x} - i\hat{y}}{\sqrt{2}} = \frac{E_0}{\sqrt{2}} \begin{bmatrix} 1 \\ -i \end{bmatrix}.$$

The effects of optical elements such as wave plates and reflective surfaces are represented by 2×2 matrices T that operate on the polarization vector through matrix multiplication. For a given initial state of polarized light $E_0$ represented as a 1×2 matrix and propagating sequentially through a series n of optical elements $T_1, T_2, \ldots, T_n$, the final polarization matrix $E_f$ is given by $$E_f = T_n T_{n-1} \ldots T_2 T_1 E_0,$$

where $T_i$ corresponds to the matrix representation for optical element $T_i$. For example, the axes transformation for a single reflection from an ideal reflective surface is summarized as $(x,y) \rightarrow (-x',y')$ so that $$\mathcal{T}_{RS}^{ideal} = \begin{bmatrix} -1 & 0 \\ 0 & 1 \end{bmatrix}.$$

For non-ideal reflective surfaces, the matrix representation is expressed as $$\mathcal{T}_{RS} = \begin{bmatrix} r_P & 0 \\ 0 & r_S \end{bmatrix},$$

where $r_p$ and $r_s$ are the electric-field reflectivities for P- and S-polarized light respectively. Embodiments that address non-ideal reflective surfaces are discussed below. In the case of ideal reflective surfaces, the following property of $$[\mathcal{T}_{RS}^{ideal}]^k = \begin{bmatrix} -1 & 0 \\ 0 & 1 \end{bmatrix}^k = \begin{cases} \begin{bmatrix} -1 & 0 \\ 0 & 1 \end{bmatrix} (k \text{ odd}) \\ \begin{bmatrix} 1 & 0 \\ 0 & 1 \end{bmatrix} (k \text{ even}) \end{cases} = \begin{cases} \mathcal{T}_{RS}^{ideal} & (k \text{ odd}) \\ \mathcal{I} & (k \text{ even}) \end{cases}$$

is noted for applications in which there are multiple ideal reflections:

$$\mathcal{T}_{RS}^{ideal}$$

The optical effect of a wave plate may also be expressed in such a matrix form. Generally, a birefringent wave plate has a polarization-dependent index of refraction. The fast axis and slow axis of the wave plate define the two orthogonal axes of the wave plate with different indices of refraction. Light polarized parallel to the slow axis experiences a phase retardance $\delta$ relative to light polarized parallel to the fast axis. Denoting the orientation of the wave plate by angle $\theta$ of the fast axis with respect to the x axis, the matrix representation for a generic wave plate is given by $$\mathcal{T}_{WP}(\theta, \delta) = \begin{bmatrix} e^{i\delta/2}\cos^2\theta + e^{-i\delta/2}\sin^2\theta & 2i\sin\theta\cos\theta\sin\delta/2 \\ 2i\sin\theta\cos\theta\sin\delta/2 & e^{-i\delta/2}\cos^2\theta + e^{i\delta/2}\sin^2\theta \end{bmatrix}.$$

For a half-wave plate, $\delta=\pi$, and for a quarter-wave plate, $\delta=\pi/2$.

4. Wavelength Routers

Figure 3A:
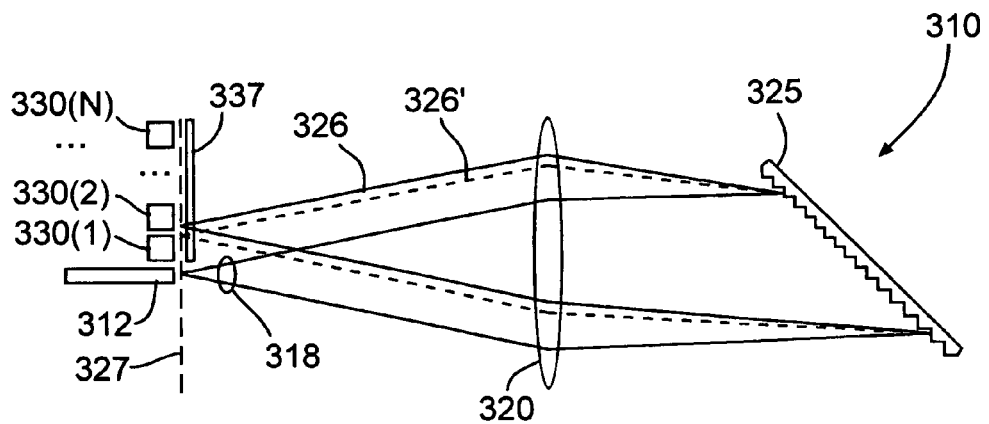
FIGS. 3A-3C are schematic top, side, and end views, respectively, of a wavelength router according to an embodiment of the invention that uses a wave plate to reduce polarization-dependent loss.
Figure 3B:
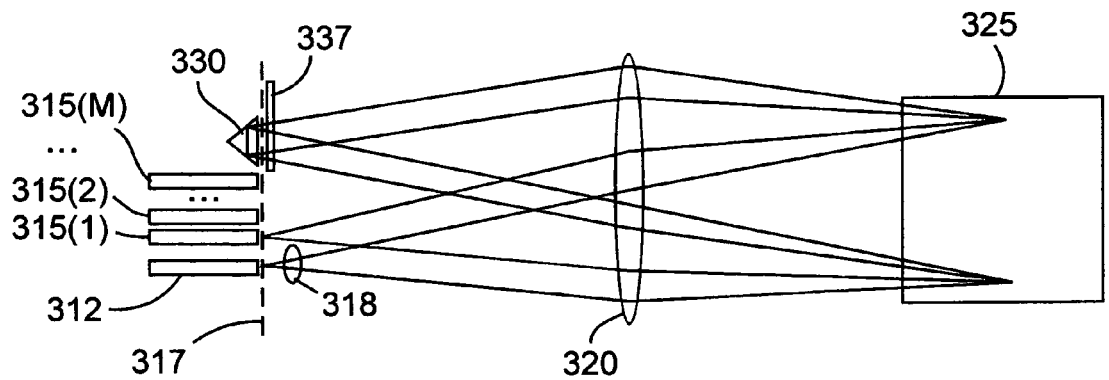
Figure 3C:
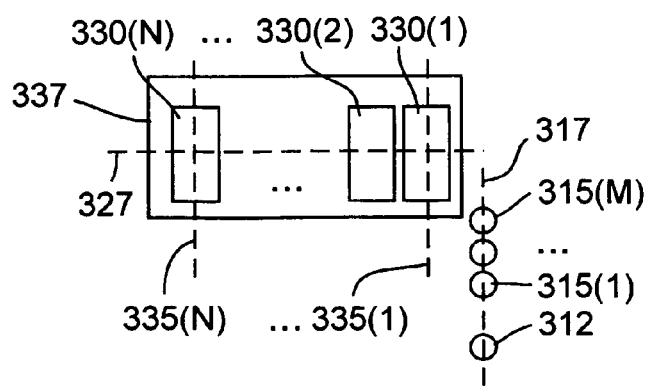

Exemplary embodiments of the invention are provided for wavelength routers, one example of which is illustrated schematically with FIGS. 3A-3C in top, side, and end views, respectively. The general functionality of the wavelength router 310 is to accept light having a plurality of (say N) spectral bands at an input port 312, and selectively direct subsets of the spectral bands to desired ones of a plurality of (say M) output ports, designated 315(1...M). The output ports are shown in the end view of FIG. 3C as disposed along a line 317 that extends generally perpendicular to the top view of FIG. 3A. The input and output ports are shown as communicating with respective input and output optical fibers, but it should be understood that the input port could also receive light directly from a light source, and the output ports could be coupled directly to optical detectors. The drawing is not to scale.

Light entering the wavelength router 310 from the input port 312 forms a diverging beam 318, which includes the different spectral bands. The beam 318 encounters a lens 320, which collimates the light and directs it to a reflection diffraction grating 325. The grating 325 disperses the light so that collimated beams at different wavelengths are directed at different angles back towards the lens 320. Two such beams are shown explicitly and denoted 326 and 326' (the latter drawn in dashed lines). Since these collimated beams encounter the lens 320 at different angles, they are focused at different points along a line 327 in a transverse focal plane. Line 327 extends in the plane of the top view of FIG. 1A.

The focused beams pass through wave plate 337 and subsequently encounter respective ones of a plurality of retroreflectors, designated 330(1...N), located near the focal plane. As described below, polarization-dependent loss may be reduced or eliminated with certain configurations of the wave plate 337 depending on the structure of the retroreflectors 330. The beams are directed, as diverging beams, back to the lens 320 after passing again through the wave plate 337. Each retroreflector 330 sends its intercepted beam along a reverse path that may be displaced in a direction perpendicular to line 327. More specifically, the beams are displaced along respective lines 335(1...N) that extend generally parallel to line 317 in the plane of the side view of FIG. 3B and the end view of FIG. 3C.

In the particular embodiment shown, the displacement of each beam is effected by moving the position of the retroreflector along its respective line 335(i). In other embodiments, the beam displacement is effected by a reconfiguration of the retroreflector. It is noted that the retroreflectors are shown above the output ports in the plane of FIG. 3C, but this is not necessary; other relative positions may occur for different orientations of the grating or other elements.

The beams returning from the retroreflectors are collimated by the lens 320 and directed once more to the grating 325. The grating 325, on the second encounter, removes the angular separation between the different beams, and directs the collimated beams back to the lens 320, which focuses the beams. However, due to the possible displacement of each beam by its respective retroreflector, the beams will be focused at possibly different points along line 317. Thus, depending on the positions of the retroreflectors, each beam is directed to one or another of output ports 315(1 . . . M).

Figure 3D:
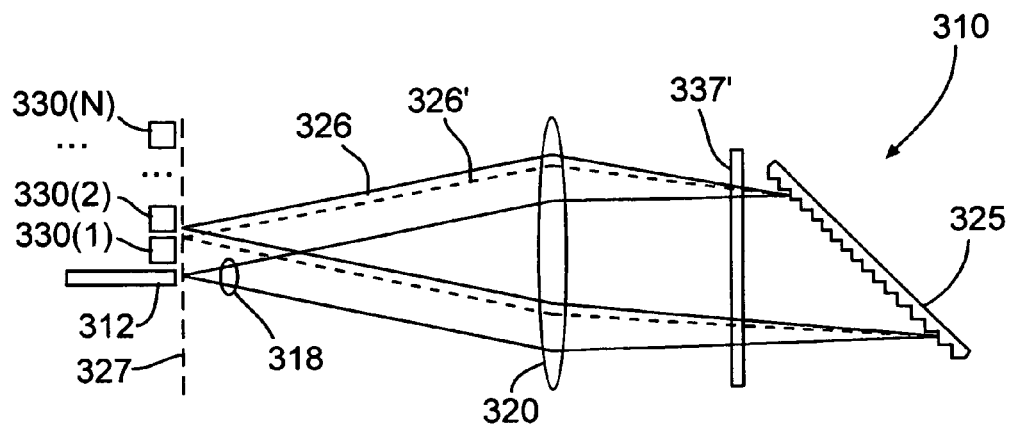
FIGS. 3D-3F are schematic top, side, and end views, respectively, of a wavelength routing according to another embodiment of the invention that uses a wave plate to reduce polarization-dependent loss.
Figure 3E:
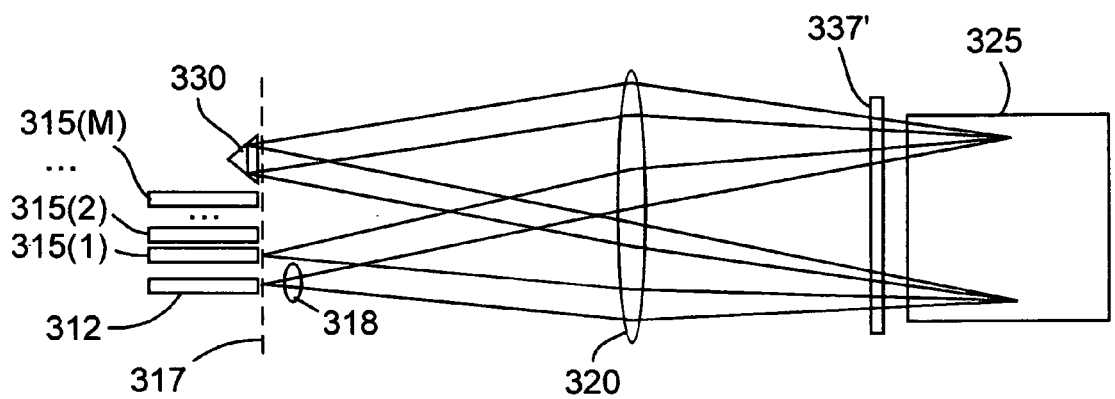
Figure 3F:
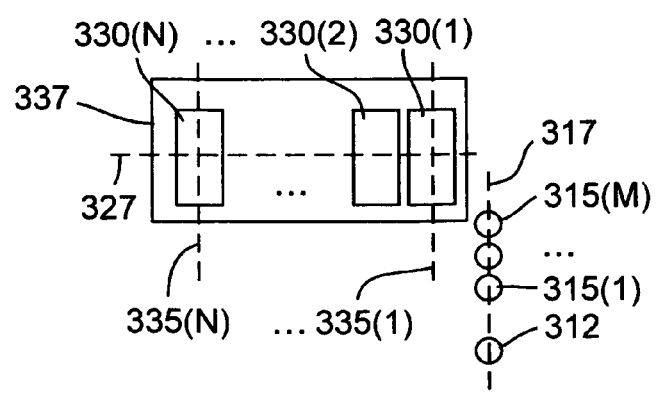

While the illustration in FIGS. 3A-3C shows the wave plate 337 at a particular location between the lens 320 and the retroreflectors 337, it may take other positions in other embodiments. For example, the wave plate 337 could be positioned nearer the lens 320 than is shown. In other embodiments, illustrated in FIGS. 3D-3F, the wave plate 337' could instead be positioned between the lens 320 and the grating 325. The position of the wave plate 337 in different embodiments may account for a desired tradeoff between cost and performance. More uniform performance is generally achieved in collimated space between the lens 320 and grating 325, but reduced cost may be achieved by using a wave plate 337 with a smaller aperture if it is positioned closer to the retroreflectors 330.

These embodiments are airspace implementations of a more generic class of what are referred to as free-space embodiments. In other free-space embodiments, the various beams are all within a body of glass. The term "free-space" refers to the fact that the light within the body is not confined in the dimensions transverse to propagation, but rather can be regarded as diffracting in these transverse dimensions. Since the second encounter with the dispersive element effectively undoes the dispersion induced by the first encounter, each spectral band exits the router with substantially no dispersion.

In addition, while the discussion herein illustrates principles of the invention in some specific embodiments that use reflection diffraction gratings, it will be evident that other embodiments may use transmissive diffraction gratings. Some discussion of wavelength routers that use transmissive diffraction gratings and in which embodiments of the invention may be adopted are described in the '061 application, which has been incorporated by reference, and in copending, commonly assigned U.S. patent application Ser. No. 09/992,087, entitled "WAVELENGTH ROUTER WITH A TRANSMISSIVE DISPERSIVE ELEMENT," filed Nov. 12, 2001 by Larry Fabiny, the entire disclosure of which is also herein incorporated by reference for all purposes.

5. Polarization-Dependent Loss Within Optical Systems

In the embodiment illustrated with FIGS. 3A, 3B, and 3C, the effect of certain configurations of the wave plate 337 is to reduce or eliminate polarization-dependent loss in the wavelength router 310. The specific effect of the wave plate may be understood by comparing the electric field that results without it (as in FIGS. 1A, 1B, and 1C of the '061 application) and with it (as in the current FIGS. 3A, 3B, and 3C). This is first done by considering the polarization-dependent loss resulting from encounters with the diffraction grating 325 without considering possible stray retardances from other elements in the system and without considering absorptive losses resulting from encounters with reflective surfaces. The effect of the wave plate 337 may thus be understood by examining the polarization state of light immediately before the first diffraction-grating encounter and the polarization state of light immediately after the second diffraction-grating encounter. The diffraction grating 325 may have a polarization-dependent efficiency so that its Jones matrix representation is $$\mathcal{T}_g = \begin{bmatrix} \varepsilon_x & 0 \\ 0 & \varepsilon_y \end{bmatrix},$$

where $\varepsilon_x$ and $\varepsilon_y$ are respectively the electric-field efficiencies of horizontally and vertically polarized light. With such a diagonal grating matrix representation, reference to orientations of wave plates made with respect to the x axis may be viewed as being measured with respect to grating rulings. More generally, for an optical system in which the diffraction grating is substituted with a generic optical element having an intrinsic polarization-dependent loss, reference to wave-plate orientations may be viewed as being measured with respect to dichroic axes of the optical element.

The electric-field vector initially incident on the diffraction grating 325 is written generally as $E_0 = \alpha\hat{x} + \beta\hat{y}$, where $\alpha$ and $\beta$ are complex electric-field coefficients. If the retroreflectors 330 have n reflective surfaces, the electric field after sequentially encountering the grating 325 a first time, encountering one of the retroreflectors 330, and encountering the grating 325 a second time, is given by $$E_f = \mathcal{T}_g [\mathcal{T}_{RS}^{ideal}]^n \mathcal{T}_g E_0$$

$$= \begin{bmatrix} \varepsilon_x & 0 \\ 0 & \varepsilon_y \end{bmatrix} \begin{bmatrix} -1 & 0 \\ 0 & 1 \end{bmatrix}^n \begin{bmatrix} \varepsilon_x & 0 \\ 0 & \varepsilon_y \end{bmatrix} \begin{bmatrix} \alpha \\ \beta \end{bmatrix}$$

$$= \begin{bmatrix} \pm \varepsilon_x^2 \alpha \\ \varepsilon_y^2 \beta \end{bmatrix},$$

where the ± corresponds to whether n is even ("+") or odd ("−"). In either case, the efficiency $\varepsilon$ is given by $$\varepsilon = \frac{E_f^\dagger \cdot E_f}{E_0^\dagger \cdot E_0} = \frac{\varepsilon_x^4 \alpha^2 + \varepsilon_y^4 \beta^2}{\alpha^2 + \beta^2}.$$

With no wave plate, the efficiency is a strong function of $\alpha$ and $\beta$. Because $\alpha$ and $\beta$ evolve slowly over time, the efficiency $\varepsilon$ is time dependent, varying between the extremes of $\varepsilon = \varepsilon_x^4$ (for horizontal polarization where $\beta=0$) and $\varepsilon = \varepsilon_y^4$ (for vertical polarization where $\alpha=0$).

The efficiency for the arrangement including the wave plate 337 positioned as shown in FIGS. 3A-3C can be calculated similarly. It is noted that the resulting efficiency is the same for any position of the wave plate 337 between the grating 325 and the retroreflectors 330, including for the arrangement shown in FIGS. 3D-3F where the wave plate 337' is positioned in collimated space.

If the retroreflectors 330 have n reflective surfaces, the electric field after sequentially encountering the grating 325 a first time, encountering the wave plate 337 a first time, encountering one of the retroreflectors 330, encountering the wave plate a second time, and encountering the grating 325 a second time, is given by $$E_f = \mathcal{T}_g \mathcal{T}_{WP}(\theta_2, \delta)[\mathcal{T}_{RS}^{ideal}]^n \mathcal{T}(\theta_1, \delta) \mathcal{T}_g E_0,$$

where $\theta_1$ and $\theta_2$ respectively define the angle of the waveplate fast axis for the first and second encounters. Some specific embodiments are noted.

First, in one embodiment, the number of reflections n provided by the retroreflector 337 is odd. In this embodiment, the wave plate 337 comprises a quarter wave plate oriented with the fast axis at 45° relative to the x axis so that $\delta=\pi/2$ and $\theta_1=\pi/4$. For the second pass through the wave plate 337, the angle of the fast axis with respect to the new x axis is $\theta_2=\pi-\pi/4=3\pi/4$. Using the fact that for an odd number of reflections, $$[\mathcal{T}_{RS}^{ideal}]^n = \mathcal{T}_{RS}^{ideal},$$

the electric field is given by $$E_f = \mathcal{T}_g \mathcal{T}_{WP}(3\pi/4, \pi/2) \mathcal{T}_{RS}^{ideal} \mathcal{T}_{WP}(\pi/4, \pi/2) \mathcal{T}_g E_0$$

$$= \begin{bmatrix} \varepsilon_x & 0 \\ 0 & \varepsilon_y \end{bmatrix} \begin{bmatrix} 1/\sqrt{2} & -i/\sqrt{2} \\ -i/\sqrt{2} & 1/\sqrt{2} \end{bmatrix} \begin{bmatrix} -1 & 0 \\ 0 & 1 \end{bmatrix} \begin{bmatrix} 1/\sqrt{2} & i/\sqrt{2} \\ i/\sqrt{2} & 1/\sqrt{2} \end{bmatrix} \begin{bmatrix} \varepsilon_x & 0 \\ 0 & \varepsilon_y \end{bmatrix} E_0$$

$$= i \begin{bmatrix} \varepsilon_x & 0 \\ 0 & \varepsilon_y \end{bmatrix} \begin{bmatrix} 0 & -1 \\ 1 & 0 \end{bmatrix} \begin{bmatrix} \varepsilon_x & 0 \\ 0 & \varepsilon_y \end{bmatrix} E_0$$

$$= i \begin{bmatrix} 0 & -\varepsilon_x \varepsilon_y \\ \varepsilon_x \varepsilon_y & 0 \end{bmatrix} E_0.$$

The resulting efficiency is independent of the incident electric field $E_0$:

$$\epsilon = \frac{E_f^\dagger \cdot E_f}{E_0^\dagger \cdot E_0}$$

$$= \frac{-i \begin{bmatrix} 0 & \varepsilon_x \varepsilon_y \\ -\varepsilon_x \varepsilon_y & 0 \end{bmatrix} E_0^\dagger \cdot i \begin{bmatrix} 0 & -\varepsilon_x \varepsilon_y \\ \varepsilon_x \varepsilon_y & 0 \end{bmatrix} E_0}{E_0^\dagger \cdot E_0}$$

$$= \frac{\varepsilon_x^2 \varepsilon_y^2 E_0^\dagger \cdot E_0}{E_0^\dagger \cdot E_0}$$

$$= \varepsilon_x^2 \varepsilon_y^2.$$

Thus, the presence of a suitably oriented quarter-wave plate for any retroreflector providing an odd number of reflections eliminates polarization-dependent loss. Using the expressions provided above, it is a matter of routine skill to verify that the efficiency $\epsilon=\epsilon_x^2 \epsilon_y^2$ is independent of the initial state of polarization for any angle $\theta_1=m\pi/4$, where m is an odd integer. Thus, for every such quarter-wave plate configuration where the retroreflectors 330 provide an odd number of reflections, the polarization-dependent loss may be eliminated.

It is noted that where the number of reflections n is even so that $$[\mathcal{T}_{RS}^{ideal}]^n = \mathcal{I},$$

the quarter-wave plate does not eliminate the polarization-dependent loss:

$$E_f = \mathcal{T}_g \mathcal{T}_{WP}(3\pi/4, \pi/2) \mathcal{I} \mathcal{T}_{WP}(\pi/4, \pi/2) \mathcal{T}_g E_0$$

-continued $$= \begin{bmatrix} \varepsilon_x & 0 \\ 0 & \varepsilon_y \end{bmatrix} \begin{bmatrix} 1/\sqrt{2} & -i/\sqrt{2} \\ -i/\sqrt{2} & 1/\sqrt{2} \end{bmatrix} \begin{bmatrix} 1 & 0 \\ 0 & 1 \end{bmatrix} \begin{bmatrix} 1/\sqrt{2} & i/\sqrt{2} \\ i/\sqrt{2} & 1/\sqrt{2} \end{bmatrix} \begin{bmatrix} \varepsilon_x & 0 \\ 0 & \varepsilon_y \end{bmatrix} E_0$$

$$= \begin{bmatrix} \varepsilon_x & 0 \\ 0 & \varepsilon_y \end{bmatrix} \begin{bmatrix} 1 & 0 \\ 0 & 1 \end{bmatrix} \begin{bmatrix} \varepsilon_x & 0 \\ 0 & \varepsilon_y \end{bmatrix} E_0$$

$$= \begin{bmatrix} \varepsilon_x^2 & 0 \\ 0 & \varepsilon_y^2 \end{bmatrix} E_0.$$

The efficiency $\epsilon$ is the same as without the quarter-wave plate, as shown by calculating the efficiency explicitly for $E_0 = \alpha \hat{x} + \beta \hat{Y}$:

$$\epsilon = \frac{E_f^\dagger \cdot E_f}{E_0^\dagger \cdot E_0} = \frac{\varepsilon_x^4 \alpha^2 + \varepsilon_y^4 \beta^2}{\alpha^2 + \beta^2}.$$

It is instead possible to eliminate the polarization-dependent loss by using a suitably oriented half-wave plate positioned between the grating 325 and the retroreflectors 330, such as in the position shown in FIG. 3A. Such a half-wave plate corresponds to $\delta=\pi$. In one such embodiment, the half-wave plate is oriented so that on the first encounter, the fast axis is at 22.5° relative to the x axis so that $\theta_1\pi=/8$. For the second pass through the wave plate 337, the angle of the fast axis with respect to the new x axis is $\theta_2=\pi-\pi/8=7\pi/8$. Using the fact that for an even number of reflections, $$[\mathcal{T}_{RS}^{ideal}]^n = \mathcal{I},$$

the electric field is given by $$E_f = \mathcal{T}_g \mathcal{T}_{WP}(7\pi/8, \pi) \mathcal{I} \mathcal{T}_{WP}(\pi/8, \pi) \mathcal{T}_g E_0$$

$$= \begin{bmatrix} \varepsilon_x & 0 \\ 0 & \varepsilon_y \end{bmatrix} \begin{bmatrix} i/\sqrt{2} & -i/\sqrt{2} \\ -i/\sqrt{2} & -i/\sqrt{2} \end{bmatrix} \begin{bmatrix} 1 & 0 \\ 0 & 1 \end{bmatrix} \begin{bmatrix} i/\sqrt{2} & i/\sqrt{2} \\ i/\sqrt{2} & -i/\sqrt{2} \end{bmatrix} \begin{bmatrix} \varepsilon_x & 0 \\ 0 & \varepsilon_y \end{bmatrix} E_0$$

$$= \begin{bmatrix} \varepsilon_x & 0 \\ 0 & \varepsilon_y \end{bmatrix} \begin{bmatrix} 0 & -1 \\ 1 & 0 \end{bmatrix} \begin{bmatrix} \varepsilon_x & 0 \\ 0 & \varepsilon_y \end{bmatrix} E_0$$

$$= \begin{bmatrix} 0 & -\varepsilon_x \varepsilon_y \\ \varepsilon_x \varepsilon_y & 0 \end{bmatrix} E_0.$$

The resulting efficiency is thus independent of the state of polarization of incident electric field $E_0$ and the polarization-dependent loss is eliminated by the two passes through the half-wave plate:

$$\epsilon = \frac{E_f^\dagger \cdot E_f}{E_0^\dagger \cdot E_0}$$

$$= \frac{\begin{bmatrix} 0 & \varepsilon_x \varepsilon_y \\ -\varepsilon_x \varepsilon_y & 0 \end{bmatrix} E_0^\dagger \cdot \begin{bmatrix} 0 & -\varepsilon_x \varepsilon_y \\ \varepsilon_x \varepsilon_y & 0 \end{bmatrix} E_0}{E_0^\dagger \cdot E_0}$$

$$= \frac{\varepsilon_x^2 \varepsilon_y^2 E_0^\dagger \cdot E_0}{E_0^\dagger \cdot E_0}$$

$$= \varepsilon_x^2 \varepsilon_y^2.$$

While the above result has been shown explicitly for a half wave plate oriented so that $\theta_1=\pi/8$, it is a matter of routine skill to verify that the efficiency $\epsilon=\epsilon_x^2\epsilon_y^2$ is independent of the initial state of polarization for any angle $\theta_1=m\pi/8$, where m is an odd integer. Thus, for every such half-wave plate configuration where the retroreflectors 330 provide an even number of reflections, the polarization-dependent loss may be eliminated.

Figure 6A:
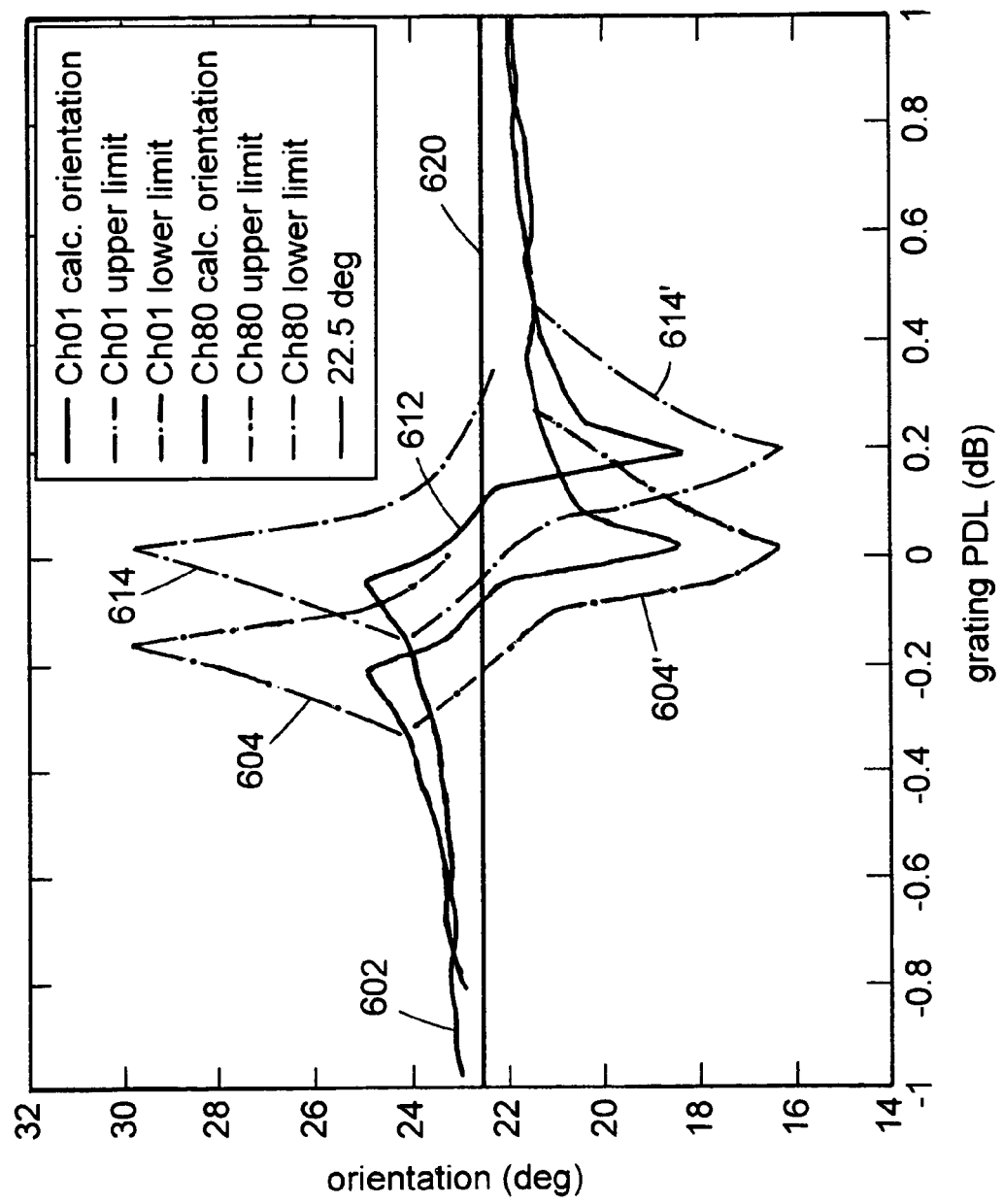
FIGS. 6A and 6B provide simulated graphical results showing optimized orientations for wave plates in optical systems where wave plates respectively have nonoptimized and optimized retardances.
Figure 6B:
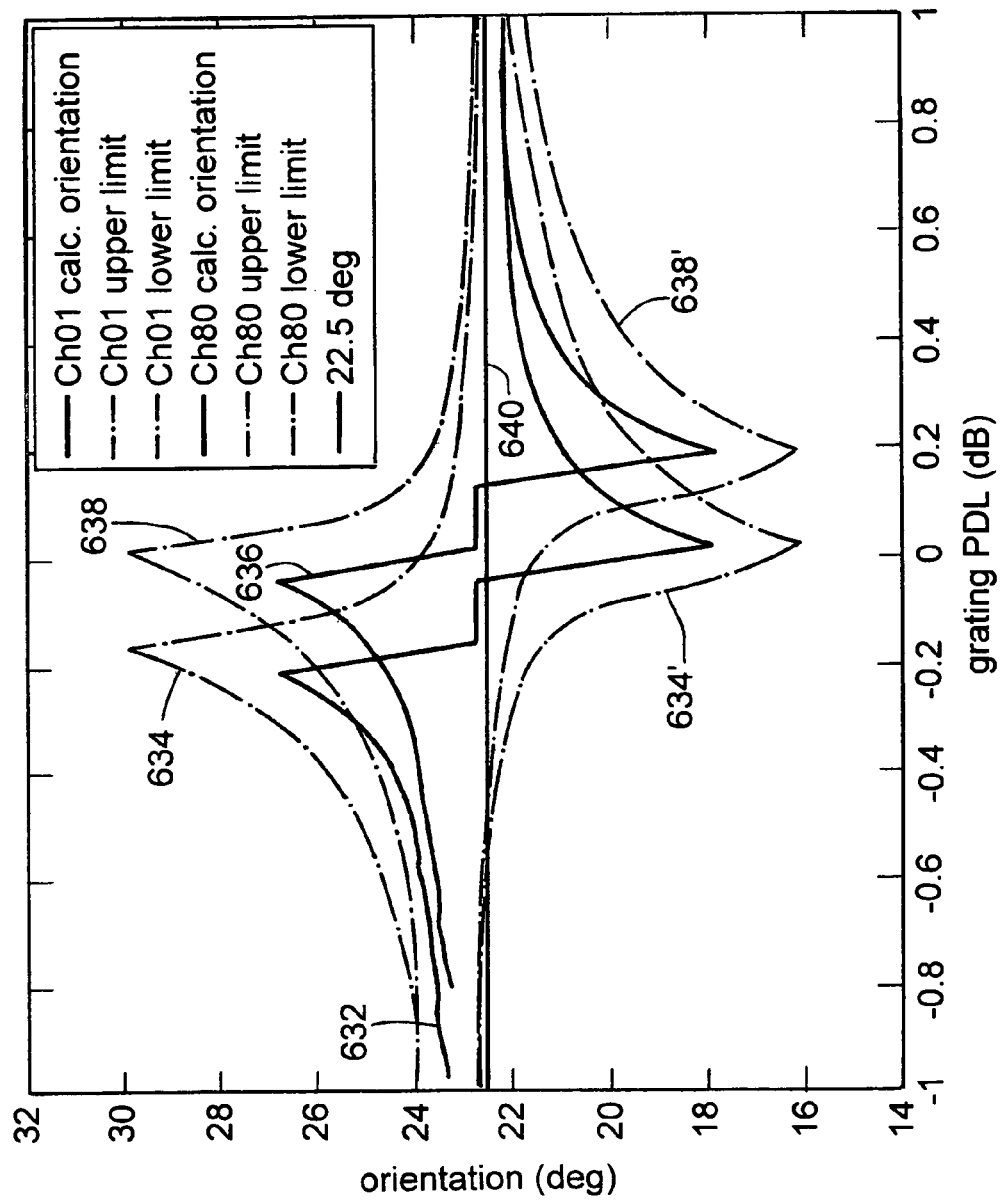

Experimental verifications have confirmed that the number of reflections that take place within the retroreflectors 330 affect whether a quarter-wave plate or half-wave plate are preferred to eliminate the polarization-dependent loss. Examples of retroreflectors 330 that use an odd number of reflections are provided in copending, commonly assigned U.S. patent application Ser. No. 09/941,998, entitled "MULTIMIRROR STACK FOR VERTICAL INTEGRATION OF MEMS DEVICES IN TWO-POSITION RETROREFLECTORS," filed Aug. 28, 2001 by Frederick Kent Copeland ("the '998 application), the entire disclosure of which is herein incorporated by reference for all purposes. Specific examples of retroreflector structures that use three reflections are shown in FIGS. 6A and 6B of the '998 application. In a wavelength router configuration such as shown in FIGS. 3A-3C that uses such a three-reflection retroreflector structure, the wave plate 337 preferably comprises a quarter-wave plate oriented so that its fast axis is at an odd multiple of 45° relative to the x axis. Other retroreflector structures that provide an odd number of reflections will be evident to those of skill in the art.

Figure 4:
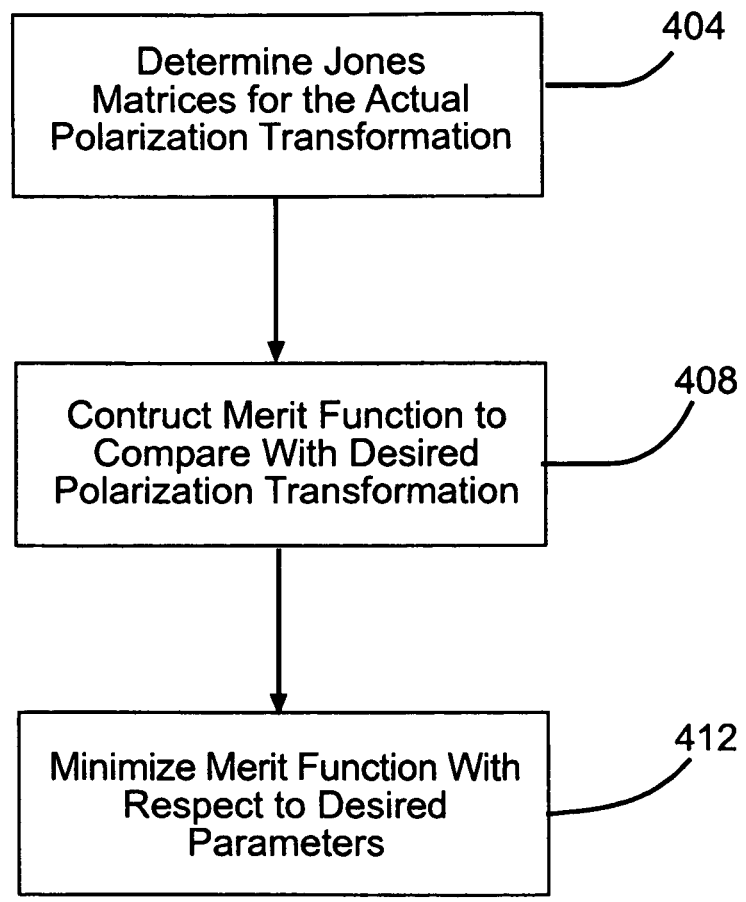
FIG. 4 is a flow diagram illustrating a method for optimizing a wave plate used to reduce PDL when reflective surfaces in the system are non-ideal.
Figure 5A:
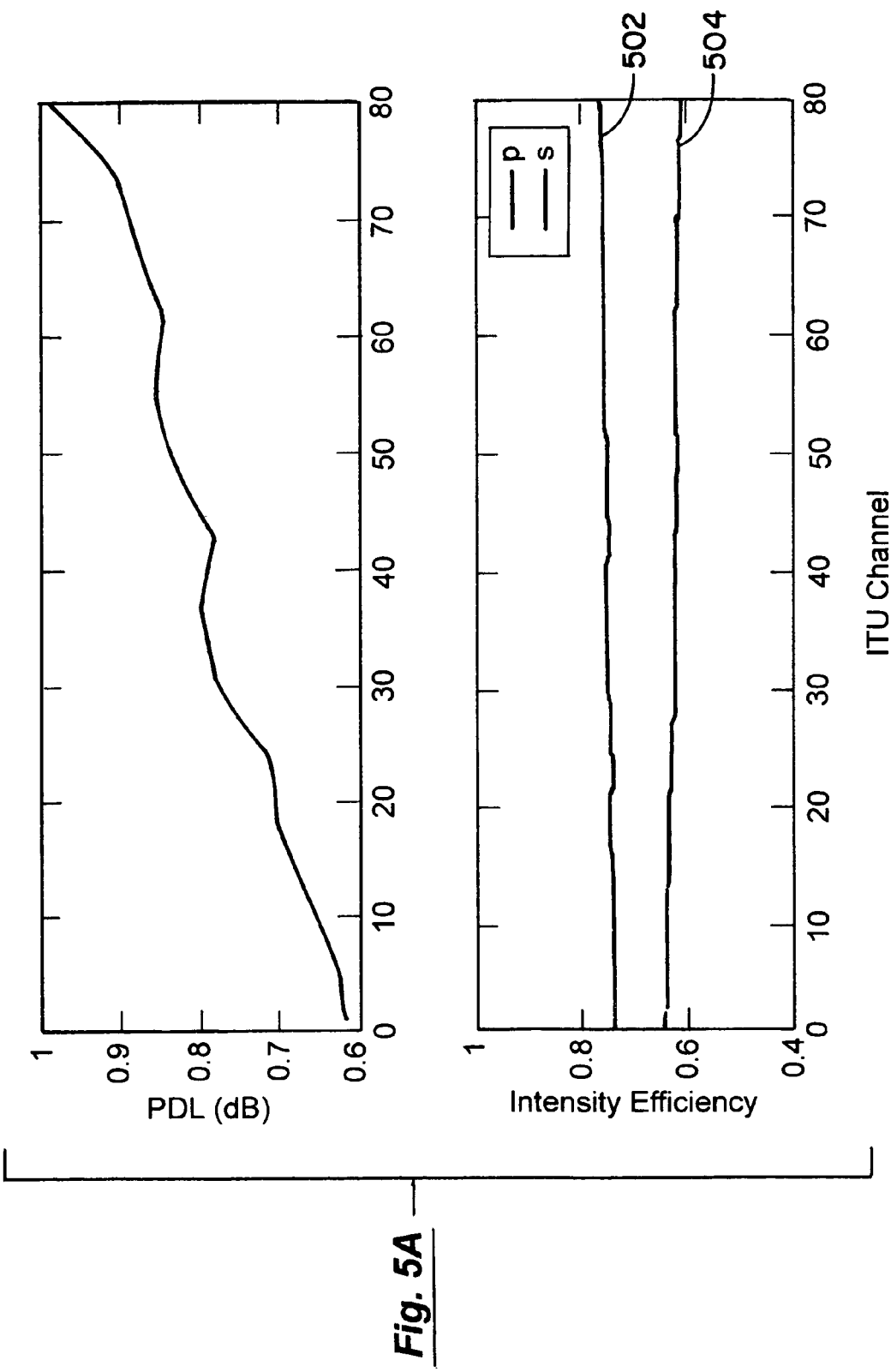
FIG. 5A shows characteristics of an exemplary diffraction grating used to illustrate certain embodiments of the optical system; results of simulations based on the exemplary diffraction grating are provided in FIG. 5B.
Figure 5B:
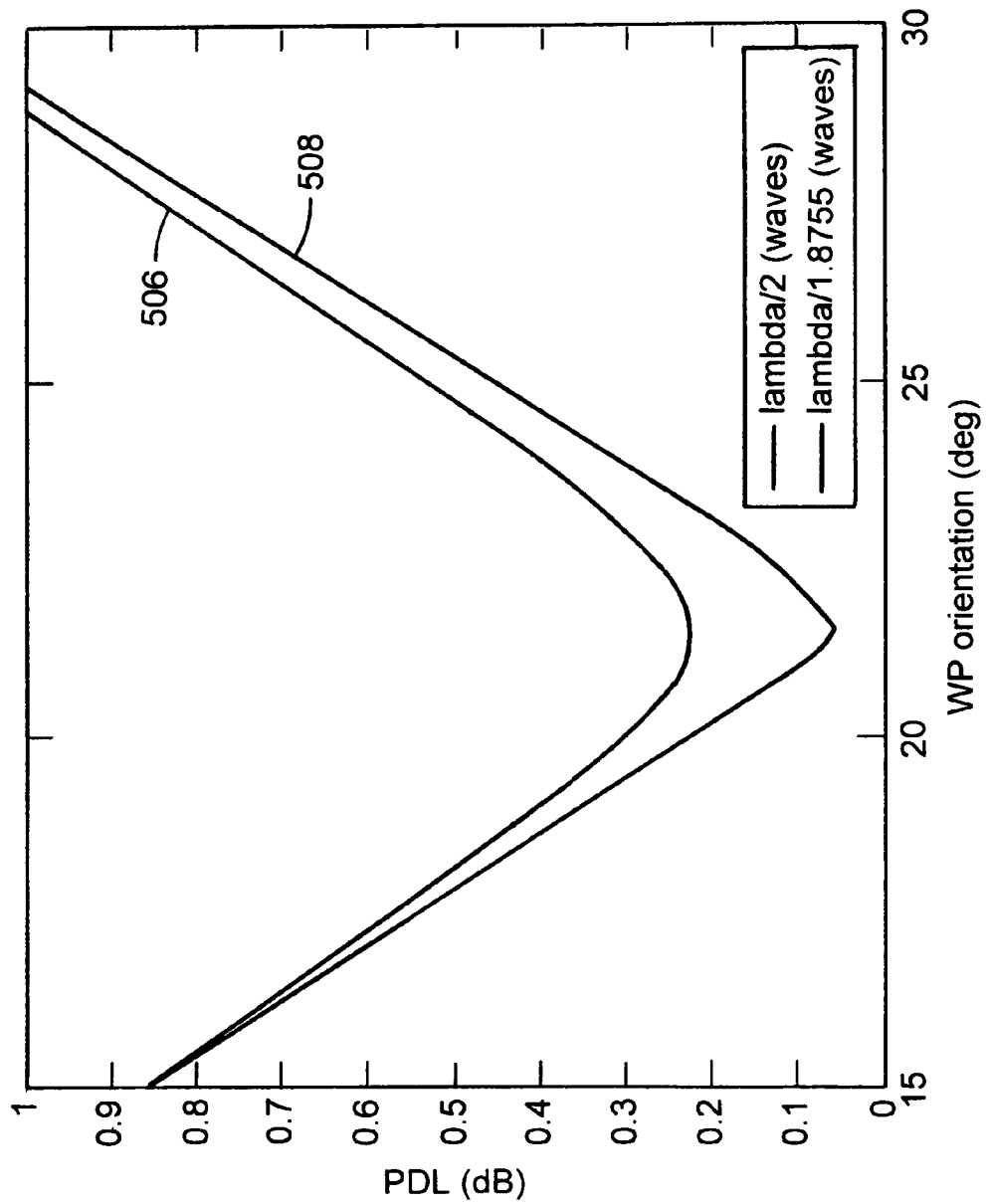

Examples of retroreflectors 330 that use an even number of reflections are provided in FIGS. 4A, 4B, and 5 of the '998 application. Such retroreflectors may use MEMS devices such as described in the following copending, commonly assigned applications, each of which is herein incorporated by reference in its entirety for all purposes: U.S. patent application Ser. No. 09/898,988, entitled "SYSTEMS AND METHODS FOR OVERCOMING STICTION USING A LEVER," filed Jul. 3, 2001 by Bevan Staple et al.; U.S. patent application Ser. No. 09/899,000, entitled "FREE-SPACE OPTICAL WAVELENGTH ROUTER BASED ON STEPWISE CONTROLLED TILTING MIRRORS," filed Jul. 3, 2001 by Victor Buzzetta et al.; U.S. patent application Ser. No. 09/899,001, entitled "TWO-DIMENSIONAL FREE-SPACE OPTICAL WAVELENGTH ROUTER BASED ON STEPWISE CONTROLLED TILTING MIRRORS," filed Jul. 3, 2001 by Victor Buzzetta; U.S. patent application Ser. No. 09/899,002, entitled "MEMS-BASED, NONCONTACTING, FREE-SPACE OPTICAL SWITCH," filed Jul. 3, 2001 by Bevan Staple and Richard Roth; U.S. patent application Ser. No. 09/899,004, entitled "BISTABLE MICROMIRROR WITH CONTACTLESS STOPS," filed Jul. 3, 2001 by Lilac Muller; and U.S. patent application Ser. No. 09/899,014, entitled "METHODS AND APPARATUS FOR PROVIDING A MULTI-STOP MICROMIRROR," filed Jul. 3, 2001 by David Paul Anderson. FIGS. 4A, 4B, and 5 of the '998 application provide examples of retroreflector structures that provide two reflections. Still other examples of retroreflector structures that provide two reflections are provided in FIGS. 4A, 4B, 5A, 5B, and 5D of the '061 application. In a wavelength router configuration such as shown in FIGS. 3A-3C that uses any of such two-reflection retroreflector structures, the wave plate 337 preferably comprises a half-wave plate oriented so that its fast axis is at an odd multiple of 22.5° relative to the x axis. Still other examples of retroreflector structures that provide an even number of reflections will be evident to those of skill in the art.

6. Use of Non-Ideal Reflective Surfaces

In certain embodiments, the (non-ideal) properties of actual reflective surfaces used in the retroreflectors 330 may cause a deviation in the desired orientation and retardation of the wave plate. In particular, the behavior of an actual (non-ideal) reflective surface may be described by a complex index of refraction for the reflective surface, $\bar{n}_{RS}=n_{RS}-ik_{RS}$. The imaginary part of the complex index of refraction accounts for absorption by the reflective material. The usual Fresnel equations relate electric-field reflectivities $r_P$ and $r_S$ for P- and S-polarized light to indices $\eta_0$ and $\eta_{RS}$, corresponding respectively to the medium of incidence and the medium of the reflective surface. For normal incidence, $$r_S = \frac{\eta_0^S - \eta_{RS}^S}{\eta_0^S + \eta_{RS}^S}$$

$$r_P = \frac{\eta_{RS}^P - \eta_0^P}{\eta_{RS}^P + \eta_0^P}.$$

The medium of incidence may be treated as nonabsorbing so that its index of refraction is given by $\bar{n}_0=n_0$ ($k_0=0$). Thus, for light incident on the reflective surface at angle $\varphi$ measured with respect to the surface normal, the indices $\eta_0$ are given by:

$$\eta_0^S = n_0 \cos\varphi$$

$$\eta_0^P = \frac{n_0}{\cos\varphi}.$$

Since the reflective surface is absorbing, the indices $\eta_{RS}$ are given by:

$$\eta_{RS}^S = a - bi$$

$$\eta_{RS}^P = c - di$$

where $$a^2 + b^2 = \sqrt{(n_{RS}^2 - k_{RS}^2 - n_0^2\sin^2\varphi)^2 + 4n_{RS}^2 k_{RS}^2}$$

$$b = \frac{1}{4}\sqrt{a^2 + b^2 - (n_{RS}^2 - k_{RS}^2 - n_0^2\sin^2\varphi)}$$

$$a = \sqrt{n_{RS}^2 - k_{RS}^2 - n_0^2\sin^2\varphi + b^2}$$

$$c = a\left(1 + \frac{n_0^2\sin^2\varphi}{a^2 + b^2}\right)$$

$$d = b\left(1 - \frac{n_0^2\sin^2\varphi}{a^2 + b^2}\right).$$

These expressions may be used to describe the behavior of a (non-ideal) reflective surface and then determine retardance and orientations of the wave plate that will minimize polarization dependent loss in the system by compensating for the additional phase shift introduced by the non-ideal reflective surfaces. For each ith reflective surface comprised by the retroreflector 330, the matrix representation $$\mathcal{T}_{RS}^{(i)}$$

is calculated from the complex index of refraction for that reflective surface:

$$\mathcal{T}_{RS}^{(i)} = \begin{bmatrix} r_P^{(i)} & 0 \\ 0 & r_S^{(i)} \end{bmatrix}.$$

The matrix representation for the retroreflector is then given by the product of the matrix representations for the individual component reflective surfaces:

$$\mathcal{T}_{retroreflector} = \mathcal{T}_{RS}^{(n)} \mathcal{T}_{RS}^{(n-1)} \dots \mathcal{T}_{RS}^{(2)} \mathcal{T}_{RS}^{(1)}.$$

A merit function $f(\theta,\delta)$ includes the degree of freedom of the wave plate and defines the difference between the desired and actual polarization transformation between two passes off the grating 325. Above, the Jones matrix $$\mathcal{T}_{desired} = \begin{bmatrix} 0 & -1 \\ 1 & 0 \end{bmatrix}$$

was shown to represent the desired polarization transformation that leads to elimination of polarization-dependent loss. Thus, the merit function $f$ may be written $$f(\theta, \delta) = \begin{bmatrix} 0 & -1 \\ 1 & 0 \end{bmatrix} - (\mathcal{T}(\pi - \theta, \delta) \mathcal{T}_{retroreflector} \mathcal{T}_{WP}(\theta, \delta)).$$

A solution in $\theta$ and $\delta$ that minimizes the merit function $f$ thus minimizes the polarization-dependent loss of the system. Generally, minimization of $f$ is determined by a suitable numerical method, several of which are known to those of skill in the art. In different embodiments, the minimization make be performed by keeping one of the parameters fixed, $$\frac{\partial f}{\partial \theta}\bigg|_\delta = 0 \text{ or } \frac{\partial f}{\partial \delta}\bigg|_\theta = 0,$$

an approach that may be desirable for various applications. For example, if a wave plate with known retardance, i.e. fixed $\delta$, is to be used, the merit function may be minimized only with respect to $\theta$ to set an orientation for the wave plate. In other embodiments, however, the merit function may be minimized with respect to both parameters, $$\frac{\partial^2 f}{\partial \delta \partial \theta} = 0.$$

The method described above for determining a retardance and/or orientation for the wave plate is summarized in FIG. 4. At block 404, Jones matrices are determined for each of the reflective surfaces in the optical system from the material properties of the reflective surfaces, thereby defining the actual polarization transformation effected. Such Jones matrices may be determined from the complex index of refraction as described. At block 408, a merit function is constructed from the Jones matrices for (non-ideal) reflective surfaces and a wave plate, and thereby defines differences between the actual and desired polarization transformation. The merit function will generally be a function of the retardance and/or orientation of the wave plate, although in certain embodiments one of these parameters may be fixed. The properties of the wave plate are determined by minimizing the merit function with respect to the desired parameter(s) at block 412.

Application of this method may be illustrated with an example using specific values for the arrangement shown in FIGS. 3A-3C for a wavelength router. In the example, the retroreflectors 330 comprise two reflective surfaces made of gold, which have indices of refraction $Re(\bar{n})=0.559$ and $Im(\bar{n})=9.81$. In the example, the optical arrangement is configured so that light is incident on the first reflective surface at an angle $\phi_1=39.5°$. The two reflective surfaces are inclined at 90° so that light is incident on the second reflective surface at an angle $\phi_2=50.5°$. Under these conditions, the product of the Jones matrices for the two reflective surfaces is $$\mathcal{T}_{retroreflector} = \mathcal{T}_{RS}^{(2)} \mathcal{T}_{RS}^{(1)} = \begin{bmatrix} 0.8094 - 0.5305i & 0 \\ 0 & 0.9444 - 0.2765i \end{bmatrix},$$

which differs from the ideal-reflective-surface case where $$[\mathcal{T}_{RS}^{ideal}]^2 = \mathcal{I},$$

the identity matrix. Supposing for purposes of illustration that the wave plate is to be oriented at $\theta=\pi/8$ with the retardance of the wave plate to be determined. The merit function may thus be written $$f(\delta) = \begin{bmatrix} 0 & -1 \\ 1 & 0 \end{bmatrix} - (\mathcal{T}_{WP}(7\pi/8, \delta) \mathcal{T}_{RS}^{(2)} \mathcal{T}_{RS}^{(1)} \mathcal{T}(\pi/8, \delta))$$

$$= \begin{bmatrix} 0 & -1 \\ 1 & 0 \end{bmatrix} - \left( \mathcal{T}_{WP}(7\pi/8, \delta) \begin{bmatrix} 0.8094 - 0.5305i & 0 \\ 0 & 0.9444 - 0.2765i \end{bmatrix} \mathcal{T}(\pi/8, \delta) \right).$$

Numerically minimizing the merit function by calculating $\partial f/\partial \delta=0$, it is found that the polarization dependent loss for this example is minimized for $\delta=1.0633\pi$, which is equivalent to a retardation of $\delta=\lambda/1.881020$ [waves].

As a further example, the minimum of the merit function has been calculated to determine a wave-plate orientation in this system for both a half wave plate and a wave plate with $\delta=\lambda/1.8755$ [waves], near the above-calculated retardance. The characteristics of a specific reflective diffraction grating used in the example are summarized in FIG. 5A. The top panel shows the PDL for the grating as a function of wavelength and the lower panel shows the intensity efficiency as a function of wavelength for both P (curve 502) and S (curve 504) polarizations. The wavelength is expressed in terms of ITU channels, which refer to a grid defined by the International Telecommunications Union. The grid defines a frequency band centered at 194,100 GHz (channel 40), and another band at every 50 GHz interval around 194,100 GHz. This corresponds to a wavelength spacing of approximately 0.4 nm around a center wavelength of approximately 1550 nm, it being understood that the grid is uniform in frequency and only approximately uniform in wavelength. For this grating, FIG. 5B shows the PDL as a function of the orientation angle of the wave plate for both the half wave plate (curve 506) and the wave plate having retardance $\delta=\lambda/1.8755$ [waves] (curve 508). For this example, the minimum in PDL for both wave plates is somewhat lower than 22.5° ($=\pi/8$), at about 21.50°.

In FIGS. 6A and 6B further results are shown for gratings having a range of PDL values. In both of these figures, the orientation angle that minimizes the merit function is calculated as a function of grating PDL for both channel 1 and channel 80 on the ITU grid. In FIG. 6A, such results are presented for a half-wave plate and in FIG. 6B, such results are presented for a wave plate having a retardance of $\delta=\lambda/1.8755$ [waves]. In addition, both figures include results showing the range over which a 0.2 dB polarization loss specification for a wavelength router can be achieved. In FIG. 6A, the calculated orientation for channel 1 is shown with solid line 602, with the 0.2 dB range shown by dot-dashed lines 604 and 604'; the calculated orientation for channel 80 is shown with solid line 612, with the 0.2 dB range shown by dot-dashed lines 614 and 614'. For reference, the 22.5° ($=\pi/8$) line 620 is also marked. Similarly, in FIG. 6B, the calculated orientation for channel 1 is shown with solid line 632, with the 0.2 dB range shown by dot-dashed lines 634 and 634'; the calculated orientation for channel 80 is shown with solid line 636, with the 0.2 dB range shown by dot-dashed lines 638 and 638'. The reference 22.5° ($=\pi/8$) line is denoted 640. It is noted from these results that the range of acceptable gratings with respect to their initial polarization-dependent loss is increased dramatically by using the calculated retardance for the wave plate instead of using a half-wave plate. This increase may be attributed to the additional correction the calculated retardance provides for using non-ideal reflective surfaces in the retroreflectors.

While specific results have been presented for embodiments in which the retroreflectors use two reflective surfaces, it will be evident from reading the foregoing description how to determine wave-plate retardances and orientations that may be used in embodiments that use other retroreflector configurations as well, including embodiments in which the retroreflectors use an odd number of reflective surfaces. Moreover, while the above illustrations have focused on the specific application of a four-pass wavelength router, it is evident that the principles of the invention may be applied to other optical arrangements, including two-pass and single-pass wavelength routers, among others. In such applications, it may be appropriate to use a plurality of wave plates with characteristics such as those determined above.

7. Correction for Stray Retardances

In addition to losses that may result from absorption characteristics of reflective surfaces in the system, the overall PDL of the optical system may additionally be affected by stray retardances imposed by other optical elements, such as by a lens in the system. The effect of such stray retardances may be to affect states of polarization of light as it propagates through the system. While the embodiments discussed above use wave plates configured to ensure that light has complementary states of polarization on its two encounters with the diffraction grating, stray retardances may result in a loss of such complementarity, leading to additional PDL. Accordingly, embodiments of the invention use a wave plate arrangement that compensates for the stray retardance imposed by other optical elements.

Principles of such embodiments are illustrated with a wavelength router similar to that discussed with reference to FIGS. 3A-3C. As shown in the top, side, and end views of FIGS. 7A, 7B, and 7C, a wavelength router 710 is provided in which light from an input port 712 is directed to output ports 715 with a four-pass arrangement that uses a diffraction grating 725, a lens 720, and a plurality of retroreflectors 730. In addition to these optical elements, a wave-plate assembly having a plurality of wave plates is provided. The plurality of wave plates is chosen so that it is possible, through selection of independent orientations of the wave plates, to change the state of polarization of light to any desired state of polarization.

This effect may be understood in terms of the Poincaré sphere, which is a geometric representation of polarization states in which every point on the surface of the sphere corresponds to a respective state of polarization. Because two degrees of freedom are needed to define the sphere, it is possible to use two degrees of freedom within the wave-plate assembly to compensate for arbitrary stray retardances. The use of a plurality of wave plates, shown in FIGS. 7A and 7B to consist of a pair 737 and 738 of wave plates, provides at least these two degrees of freedom. In particular, in one embodiment a first 737 of the wave plates comprises a half wave plate and a second 738 of the wave plates comprises a quarter wave plate, and the two degrees of freedom correspond to the orientations of each of the wave plates. Other combinations of wave plates with different retardances that permit full coverage of the Poincaré sphere are also possible and will be evident to those of skill in the art.

Figure 7A:
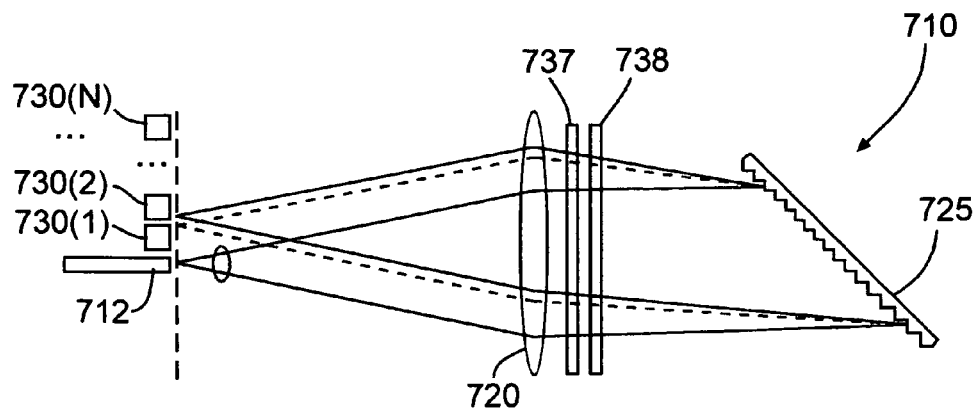
FIGS. 7A-7C are schematic top, side, and end views, respectively, of a wavelength router according to an embodiment of the invention that uses a plurality of wave plates to reduce polarization dependent loss.
Figure 7B:
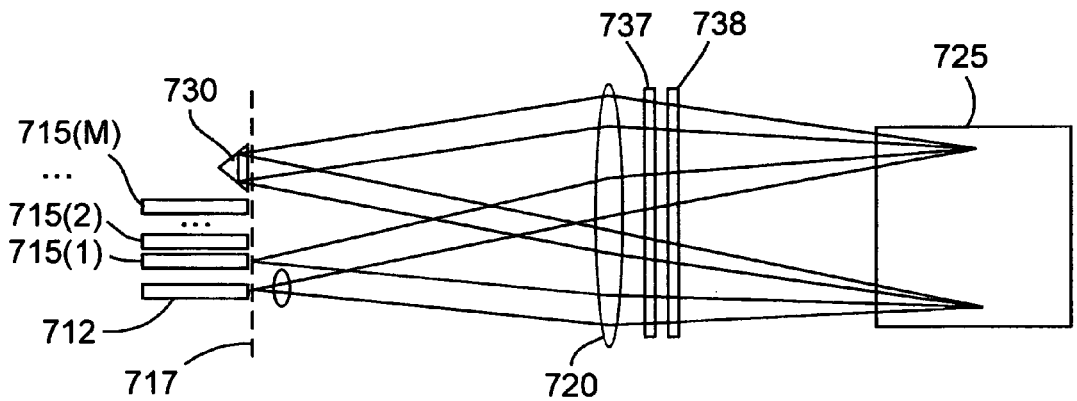

The positions of the wave plates 737 and 738 with respect to the other optical elements in the system need not be as shown in FIGS. 7A and 7B, between the lens 720 and the diffraction grating 725 and may be physically separated. More generally, both of the wave plates 737 and 738 may be positioned anywhere within the optical system where they will encounter the optical rays. For example, rather than positioning both wave plates between the lens 720 and diffraction grating 725, both may be positioned between the lens 720 and the retroreflectors 730, or one may be positioned between the lens 720 and the diffraction grating 725 with the other positioned between the lens 720 and the retroreflectors 730. The wave plates also need not be positioned in a particular order with respect to each other. It is preferred that the wave plates have sufficient angles of acceptance to provide uniform retardance in case the light is not perfectly collimated. If positioned for use with an expanding or focusing beam, true zero-order wave plates may be suitable because of their high angle of acceptance. If positioned for use with a collimated beam, compound zero-order wave plates may be suitable.

Figure 7C:
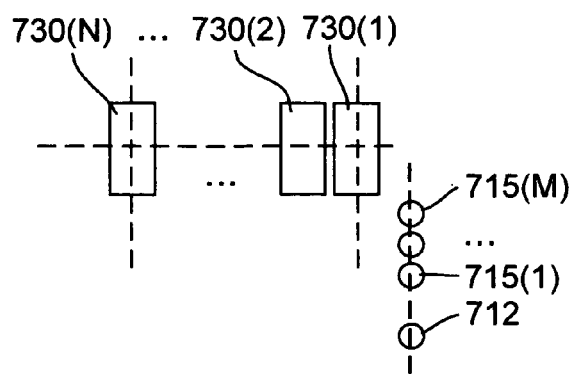
Figure 8A:
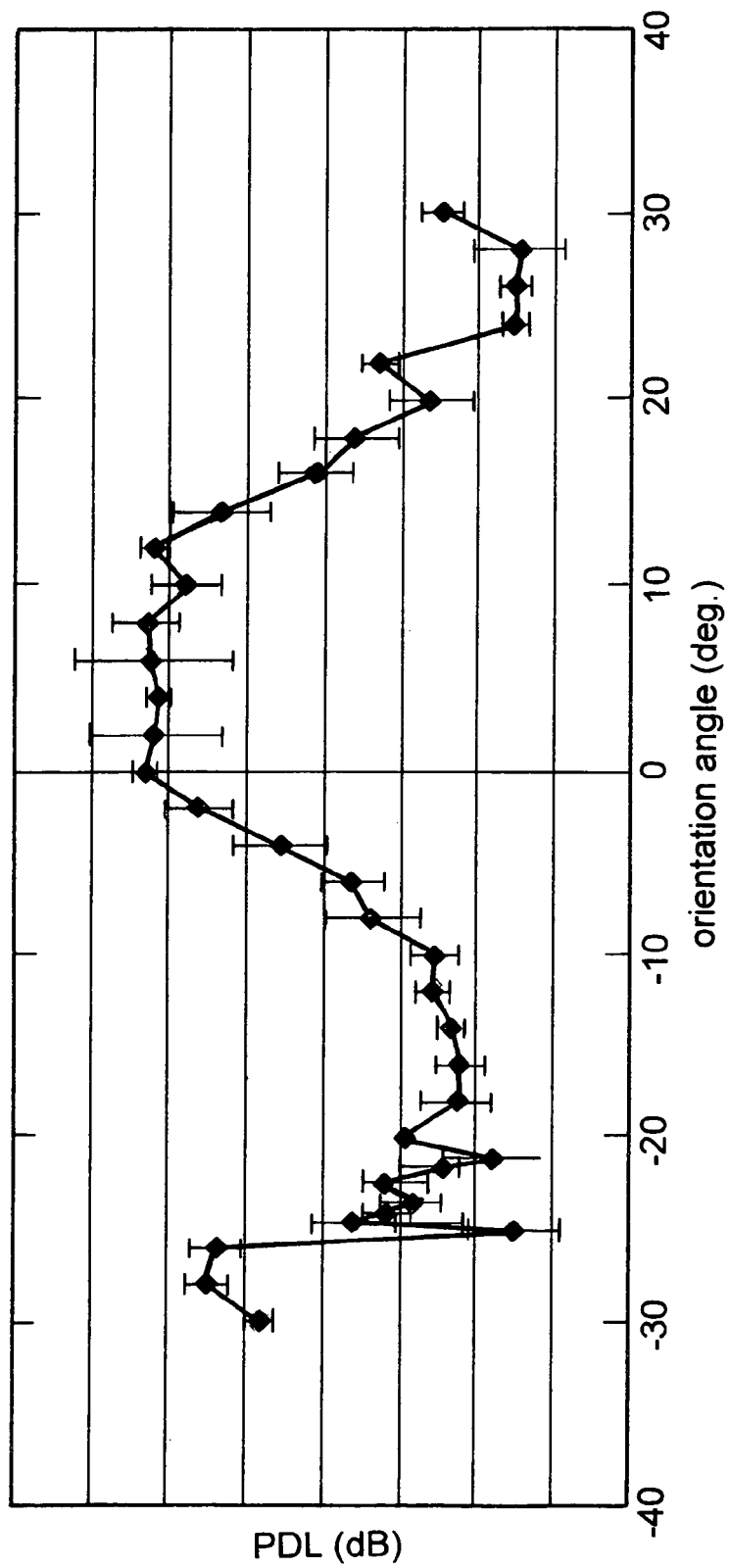
FIGS. 8A and 8B provide experimental results showing the effect of configuring a wavelength router as shown in FIGS. 7A-7C.

Experimental measurements have been made to verify that the PDL may be reduced to account for stray retardances in this manner. First, a wavelength router configured as shown in FIGS. 7A-7C with only a single half-wave plate 737 (and no other wave plate) was manufactured with retroreflectors 730 having two reflective surfaces. Measurements were made of the PDL as a function of the orientation of the half-wave plate 737, the results of which are shown in FIG. 8A. These results illustrate the general trend discussed in the previous section, with the PDL showing local minima for orientation angles near ±22.50°. The minimum PDL is approximately 0.3 dB and occurs at about −25°.

Figure 8B:
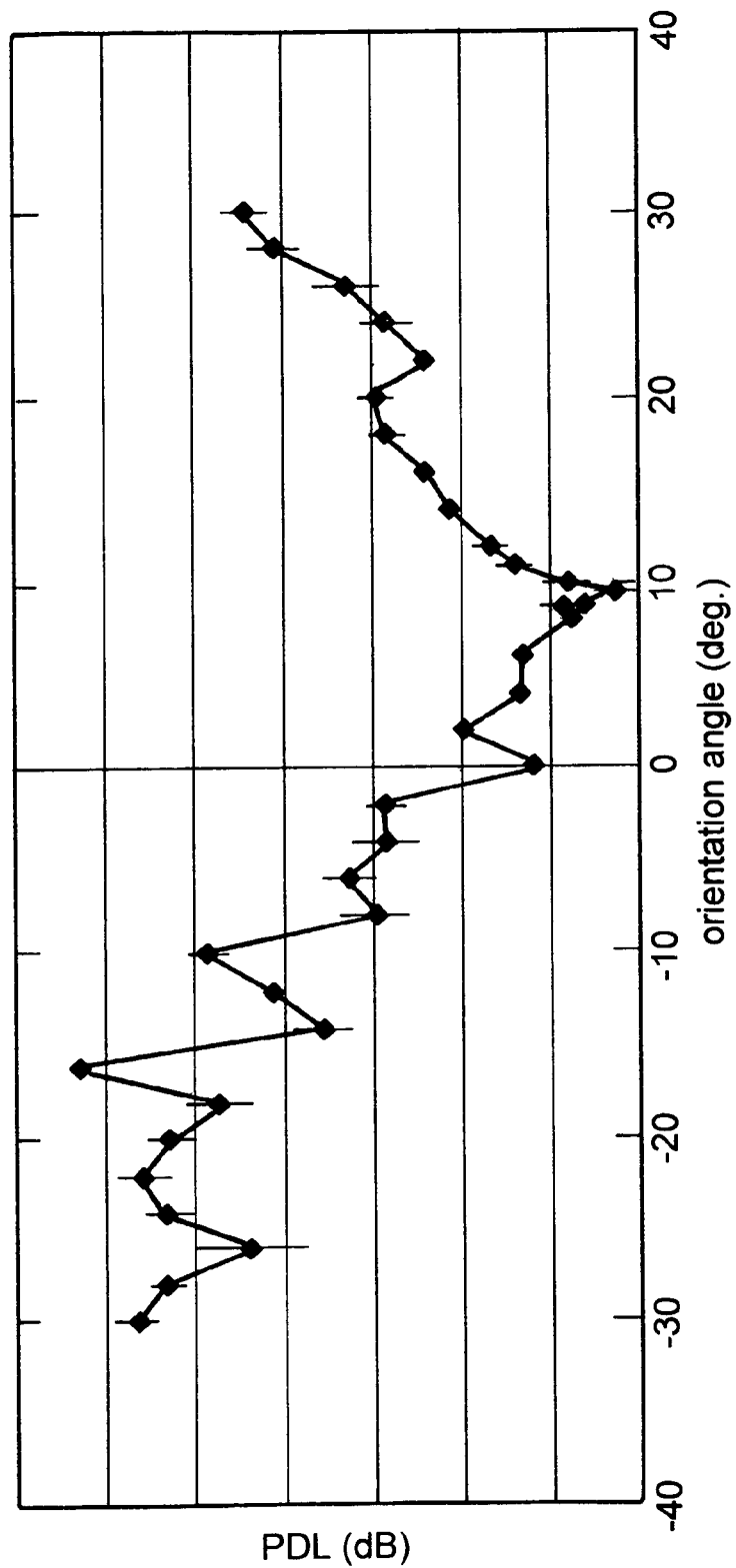

FIG. 8B shows the results of similar measurements made after inserting the quarter-wave plate 738 in the optical path and leaving the half-wave plate 737 oriented at an angle of −25°. The abscissa in FIG. 8 corresponds to the orientation angle of the quarter-wave plate 738. It is noted that at an angle of approximately 9.5°, the PDL is reduced sharply to about 0.06 dB. The specific angle at which the minimum occurs is a function of the stray retardances in the optical system, but the result demonstrates that such stray retardances may be accommodated in this manner to reduce the PDL further.

In other embodiments, the two degrees of freedom used to access arbitrary states of polarization corresponding to points on the Poincaré are provided with alternative wave-plate arrangements. One such alternative embodiment uses a wave plate having a variable retardance and variable orientation of the fast axis. Such a wave plate may be provided, for example, with a liquid-crystal retarder in which the total retardance may be varied according to a voltage applied to input terminals of the wave plate. The orientation of the fast axis of such a liquid-crystal wave plate may be varied by rotating the liquid-crystal retarder about its center of symmetry.

8. Single-Pass Wave-Plate Configurations

The illustrations above use wave plates in multipass configurations, regardless of where the wave plates are positioned, even where the wave plates are positioned proximate the retroreflectors as shown explicitly in FIGS. 3A-3C. In alternative embodiments, wave plates may be used in single-pass configurations to reduce PDL. In certain single-pass configurations, it is also possible to accommodate stray-retardances from other optical elements in the system.

Figure 9A:
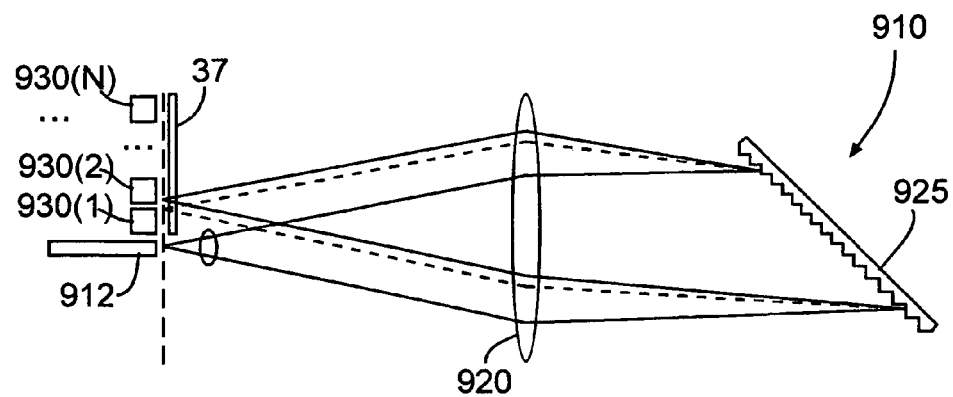
FIGS. 9A and 9B are schematic top and side views, respectively, of a wavelength router according to an embodiment of the invention that uses a single-pass wave plate.
Figure 9B:
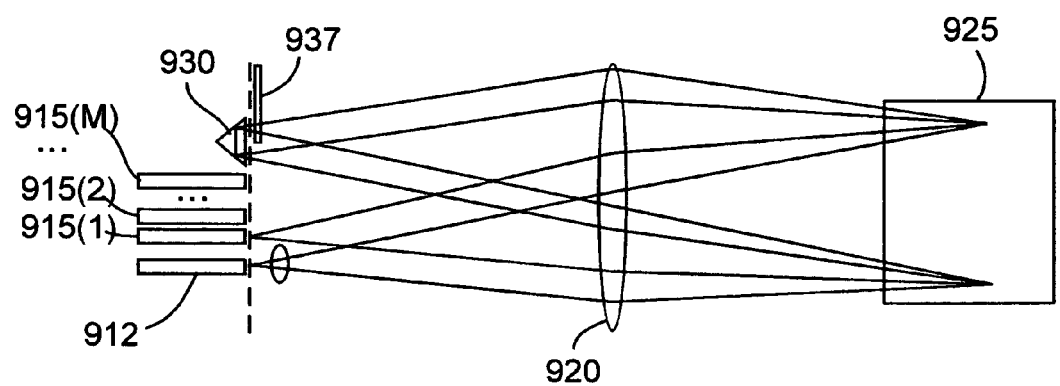

Such single-pass configurations are illustrated schematically for an application that uses a wavelength router in FIGS. 9A and 9B, which provide top and side views corresponding generally to FIGS. 3A and 3B. The wavelength router is denoted generally by reference numeral 910 and is configured in a four-pass arrangement to route signals from an input port 912 to output ports 915 with a lens 920, a diffraction grating 925, and a plurality of retroreflectors 930. A wave plate 937 is positioned so that it is encountered only once by any of the spectral bands. This may be accomplished, for example, with the retroreflector arrangements described in the '998 application by adding a wave plate to the retroreflector structure that encounters only one of the incoming and outgoing light rays. A wave plate disposed in this manner may be added both to the retroreflector structures using an even number of reflective surfaces (such as in FIGS. 4A, 4B, and 5 of the '998 application) and to the retroreflector structures using an odd number of reflective surfaces (such as in FIGS. 6A and 6B of the '998 application).

The effect of the single-pass wave plate may be represented in terms of the Jones matrix notation as follows:

$$E_f = \mathcal{T}_g S(-\psi)[\mathcal{T}_{RS}^{ideal}]^n \mathcal{T}_{WP} S(\psi) \mathcal{T}_g E_i,$$

where the effect of the stray retardance is denoted generally by S. This matrix representation effectively lumps together the stray retardance for all other optical elements in the system between encounters with the diffraction grating. The stray retardance is treated as a linear retardance with its fast axis oriented at an angle $\Psi$ and has the explicit matrix representation $$S(\psi) = \begin{bmatrix} \gamma_0 & \gamma_x \\ \gamma_x & \gamma_0^* \end{bmatrix}$$

$$S(-\psi) = \begin{bmatrix} \gamma_0 & -\gamma_x \\ -\gamma_x & \gamma_0^* \end{bmatrix},$$

where $\gamma_0$ and $\gamma_x$ are respectively the on-axis and off-axis elements of the retardance.

In embodiments where the retroreflectors 930 use an even number of reflections, it is preferable that the wave plate 937 comprise a half wave plate oriented at an odd multiple of $\pi/4$. Thus, dropping overall phases, for $\kappa=\pm 1, \pm 3, \pm 5, \ldots$ $$\mathcal{T}_{WP} = \mathcal{T}_{WP}(\theta = \kappa\pi/4, \delta = \pi) = \begin{bmatrix} 0 & 1 \\ 1 & 0 \end{bmatrix}, \text{ so that}$$

$$S(-\psi)[\mathcal{T}_{RS}^{ideal}]^n \mathcal{T}_{WP} S(\psi) = S(-\psi) I \mathcal{T}_{WP} S(\psi) = (|\gamma_0|^2 - \gamma_x^2)\begin{bmatrix} 0 & 1 \\ 1 & 0 \end{bmatrix}.$$

Similarly, in embodiments where the retroreflectors use an odd number of reflections, it is preferable that the wave plate 937 comprise a circular half wave plate, i.e., $$T_{WP} = \begin{bmatrix} 0 & 1 \\ -1 & 0 \end{bmatrix}$$

so that $$S(-\psi)[\mathcal{T}_{RS}^{ideal}]^n \mathcal{T}_{WP} S(\psi) = S(-\psi)\mathcal{T}_{RS}^{ideal} \mathcal{T}_{WP} S(\psi) = -(|\gamma_0|^2 - \gamma_x^2)\begin{bmatrix} 0 & 1 \\ 1 & 0 \end{bmatrix}.$$

With such wave plates, the effect of the optical system for all n, i.e. for any number of reflections produced by the retroreflectors 930, may be expressed as $$\begin{aligned}
E_f &= (-1)^n \mathcal{T}_g (|\gamma_0|^2 - \gamma_x^2)\begin{bmatrix} 0 & 1 \\ 1 & 0 \end{bmatrix}\mathcal{T}_g E_i \\
&= (-1)^n (|\gamma_0|^2 - \gamma_x^2)\begin{bmatrix} \varepsilon_x & 0 \\ 0 & \varepsilon_y \end{bmatrix}\begin{bmatrix} 0 & 1 \\ 1 & 0 \end{bmatrix}\begin{bmatrix} \varepsilon_x & 0 \\ 0 & \varepsilon_y \end{bmatrix} E_i \\
&= (-1)^n (|\gamma_0|^2 - \gamma_x^2)\begin{bmatrix} 0 & \varepsilon_x \varepsilon_x \\ \varepsilon_x \varepsilon_y & 0 \end{bmatrix} E_i.
\end{aligned}$$

The resulting efficiency is independent of the incident electric field $E_0$:

$$\begin{aligned}
\varepsilon &= \frac{E_f^\dagger \cdot E_f}{E_i^\dagger \cdot E_i} = \frac{(|\gamma_0|^2 - \gamma_x^2)\begin{bmatrix} 0 & \varepsilon_x \varepsilon_y \\ \varepsilon_x \varepsilon_y & 0 \end{bmatrix} E_i^\dagger \cdot (|\gamma_0|^2 - \gamma_x^2)\begin{bmatrix} 0 & \varepsilon_x \varepsilon_y \\ \varepsilon_x \varepsilon_y & 0 \end{bmatrix} E_i}{E_i^\dagger \cdot E_i} \\
&= \frac{(|\gamma_0|^2 - \gamma_x^2)^2 \varepsilon_x^2 \varepsilon_y^2 E_i^\dagger \cdot E_i}{E_i^\dagger \cdot E_i} \\
&= (|\gamma_0|^2 - \gamma_x^2)^2 \varepsilon_x^2 \varepsilon_y^2.
\end{aligned}$$

Thus, the presence of the appropriate single-pass wave plate eliminates polarization-dependent loss. It is also noted that where the stray retardance is linear, $$|\gamma_0|^2 - \gamma_x^2 = 1,$$

the (polarization-independent) efficiency is $\epsilon = \epsilon_x^2 \epsilon_y^2$.

Having described several alternative embodiments, it will be recognized by those of skill in the art that various other modifications, alternative constructions, and equivalents may be used without departing from the spirit of the invention. For example, the principles of the invention may be readily applied to optical systems using any intrinsic-PDL optical element that is encountered twice, the use of a diffraction grating being merely exemplary. Also, alternative embodiments may use double-pass, single-pass, eight-pass or other configurations of wavelength routers, including the general configurations shown in FIGS. 2A-3 of the '061 application. Accordingly, the above description should not be taken as limiting the scope of the invention, which is defined in the following claims.

What is claimed is:

1. An optical system for routing light, the optical system comprising:
    an optical element having an intrinsic polarization-dependent loss and disposed to be encountered by the light at least twice;
    a reflective element disposed to be encountered by the light between encounters with the optical element; and
    a wave plate disposed to be encountered by the light between encounters with the optical element, wherein the wave plate has a retardance optimized according to a material property of the reflective element to reduce polarization-dependent loss in the system and/or the wave plate has an orientation optimized according to a material property of the reflective element to reduce polarization-dependent loss in the optical system,
wherein:
    the light comprises a plurality of spectral bands;
    the optical element comprises a dispersive element; and
    the reflective element comprises a plurality of dynamically configurable routing elements to direct given spectral bands depending on a state of each such dynamically configurable routing element.

2. An optical system for routing light, the optical system comprising:
    an optical element having an intrinsic polarization-dependent loss disposed to be encountered by the light at least twice along an optical path;
    a reflective element disposed to be encountered by the light between encounters with the optical element; and
    a wave plate disposed to be encountered by the light exactly once between encounters with the optical element,
wherein:
    the reflective element comprises an even number of reflective surfaces disposed to be encountered by the light; and
    the wave plate comprises a half-wave plate having a fast axis oriented with respect to dichroic axes of the optical element at substantially an odd multiple of 45°.

* * * * *